US012230090B2

(12) United States Patent
Isshiki et al.

(10) Patent No.: US 12,230,090 B2
(45) Date of Patent: Feb. 18, 2025

(54) SHEET STORAGE DEVICE

(71) Applicant: Glory Ltd., Himeji (JP)

(72) Inventors: Kei Isshiki, Himeji (JP); Takeshi Yokawa, Himeji (JP); Hiroyuki Yanai, Himeji (JP)

(73) Assignee: GLORY LTD., Himeji (JP)

(*) Notice: Subject to any disclaimer, the term of this patent is extended or adjusted under 35 U.S.C. 154(b) by 909 days.

(21) Appl. No.: 17/197,142

(22) Filed: Mar. 10, 2021

(65) Prior Publication Data

US 2021/0287474 A1 Sep. 16, 2021

(30) Foreign Application Priority Data

Mar. 11, 2020 (JP) ................................ 2020-042320

(51) Int. Cl.

| | |
|---|---|
| ***G07D 11/13*** | (2019.01) |
| ***B65H 5/28*** | (2006.01) |
| ***B65H 29/00*** | (2006.01) |
| ***G07D 11/40*** | (2019.01) |
| *G07D 11/14* | (2019.01) |
| *G07D 11/34* | (2019.01) |

(52) U.S. Cl.

CPC ............. *G07D 11/13* (2019.01); *G07D 11/40* (2019.01); *G07D 11/14* (2019.01); *G07D 11/34* (2019.01); *G07D 2211/00* (2013.01)

(58) Field of Classification Search

CPC ........ B65H 29/006; B65H 2301/41912; B65H 2701/1912; B65H 2601/324; G07D 11/13; G07D 11/40; G07D 11/16; G07D 11/14; G07D 11/34

See application file for complete search history.

(56) References Cited

U.S. PATENT DOCUMENTS

| | | | | |
|---|---|---|---|---|
| 2019/0291997 A1* | 9/2019 | Yokawa | ............... | B65H 29/006 |
| 2021/0253388 A1* | 8/2021 | Brugger | ............... | B65H 29/006 |
| 2021/0284477 A1* | 9/2021 | Yokawa | ............... | B65H 29/006 |

FOREIGN PATENT DOCUMENTS

| | | |
|---|---|---|
| CN | 104952146 B | 9/2017 |
| JP | 2019-167232 A | 10/2019 |
| WO | 2018/008247 A1 | 1/2018 |

* cited by examiner

*Primary Examiner* — Luis A Gonzalez

(74) *Attorney, Agent, or Firm* — XSENSUS LLP

(57) ABSTRACT

A sheet storage device includes a cartridge and a body. The cartridge has a tape reel and a holder. The holder holds the tape reel. The body has a drum that winds, together with a tape drawn out of the tape reel, a sheet around the drum to house the sheet. The cartridge is detachably attached to the body.

13 Claims, 17 Drawing Sheets

SHEET STORAGE DEVICE

CROSS-REFERENCE TO RELATED APPLICATION

This application claims priority to Japanese Patent Application No. 2020-042320 filed on Mar. 11, 2020, the entire disclosure of which is incorporated herein by reference.

BACKGROUND

A conventional sheet storage device is attached to a sheet handling device and includes four tape reels and a drum. The drum winds up, together with sheets, and tapes are drawn out of each tape reel. By winding the sheets around the drum, the sheet storage device stores the sheets. By feeding the sheets out of the drum, the sheet storage device feeds out the stored sheets.

SUMMARY

An aspect of the present disclosure relates to a sheet storage device comprising a cartridge having a tape reel and a holder that holds the tape reel, and a body having a drum that winds, together with a tape drawn out of the tape reel, a sheet around the drum to house the sheet. The cartridge is detachably attached to the body.

DETAILED DESCRIPTION OF THE DRAWINGS

Figure 1:
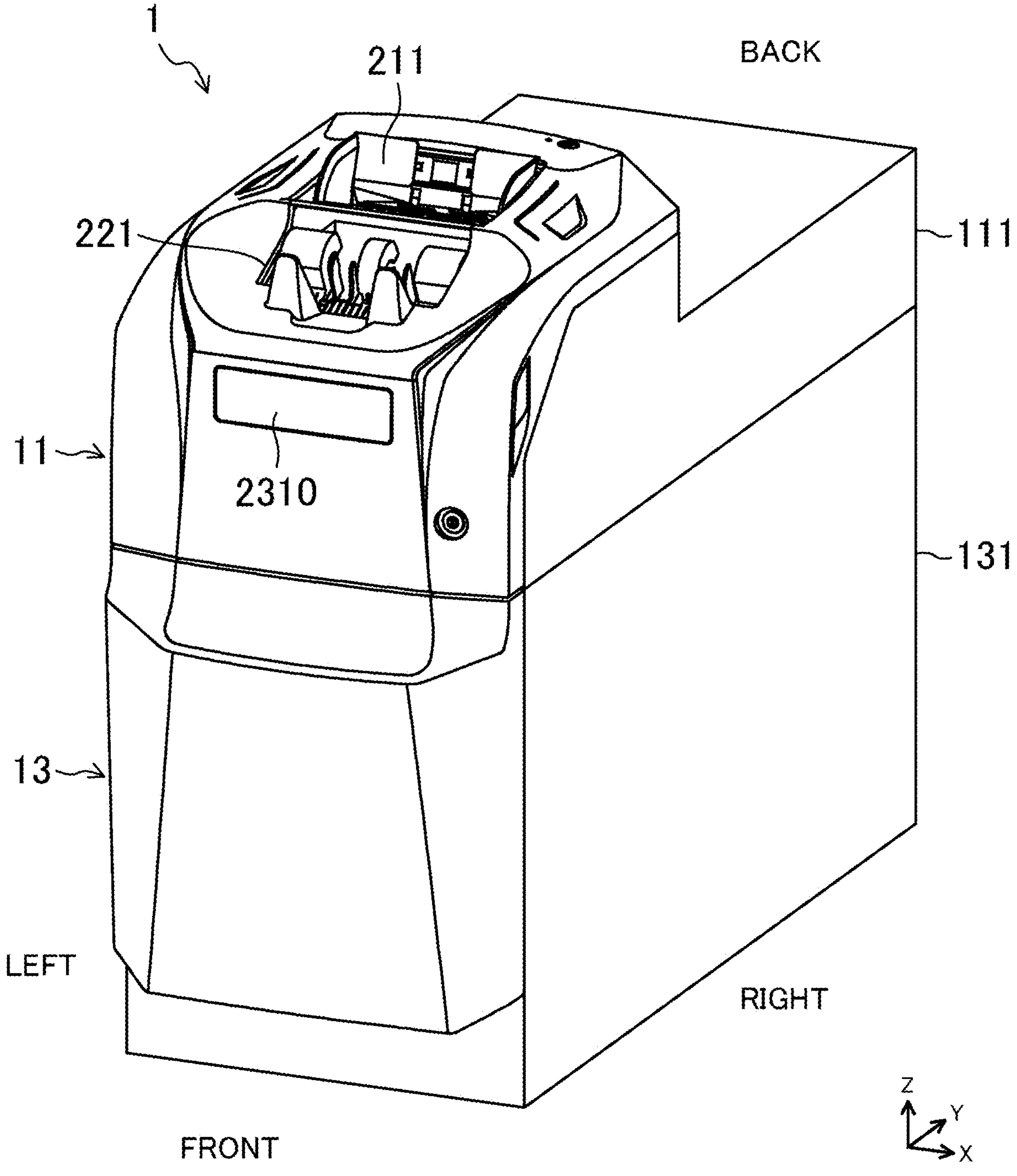
FIG. 1 is a perspective view illustrating an external appearance of a banknote handling device.

When a defect such as cutting of the tapes is caused in the sheet storage device, a maintenance person needs to replace the tapes and the tape reels.

However, each of a shaft of the tape reels and a shaft of the drum is fixed to a housing of the sheet storage device. Moreover, the tape reels are coupled to a drive source. Thus, the maintenance person needs to take at least the following steps upon replacement of the tape reels. (1) The sheet storage device is taken out of the sheet handling device. (2) The tape reels and the drive source are detached from each other. (3) The shaft of the tape reels is taken out of the housing. (4) The tape reels are detached from the shaft of the tape reels.

For attaching new tape reels to the sheet storage device, the steps need to be taken in the order opposite to that described above.

As described above, the typical sheet storage device is extremely complicated in the steps of replacing the tape reels. For this reason, in some cases, the maintenance person might fail to replace the tape reels of the sheet storage device at a location where the sheet handling device is placed. In this case, the maintenance person sends the sheet storage device taken out of the sheet handling device to a repair center. At the repair center, a person in charge replaces the tape reels. The typical sheet storage device needs a great amount of cost and long time for replacing the tape reels.

Techniques disclosed herein facilitate replacement of the tape reels in a sheet storage device.

In particular, a technique disclosed herein relates to a sheet storage device. The sheet storage device includes a cartridge having a tape reel and a holder that holds the tape reel, and a body having a drum that winds, together with a tape drawn out of the tape reel, a sheet around the drum to house the sheet. The cartridge is detachably attached to the body.

The maintenance person can replace the tape reel of the sheet storage device by replacement of the cartridge.

The holder may hold the tape reel around which the tape is wound across the entire length thereof.

The cartridge can hold the entire length of the tape.

The holder may have a tape opening through which the tape passes.

The tape drawn out of the holder through the tape opening is wound around the drum.

The body may have a drive source and a transmission mechanism configured to transmit drive force from the drive source to the tape reel, and the cartridge may have a connection unit connected to the transmission mechanism in a state in which the cartridge is attached to the body.

When the cartridge is attached to the body, the drive source and the tape reel are connected to each other. The drive source can drive the tape reel.

A sheet may be wound around the drum together with a plurality of tapes, and the holder may hold a plurality of tape reels each corresponding to the plurality of tapes.

The maintenance person can replace the plurality of tape reels by replacement of the single cartridge.

A sheet may be wound around the drum together with a plurality of tapes, the holder may hold a plurality of tape reels each corresponding to the plurality of tapes, and the cartridge may have a distribution mechanism configured to distribute the input drive force to each of the plurality of tape reels.

The plurality of tape reels is driven through the distribution mechanism.

The drum may wind up a sheet sandwiched by the plurality of tapes at least partially overlapping with each other, and the holder may hold the plurality of tape reels in a state in which the plurality of tape reels is arranged on the same axis.

The plurality of tape reels is arranged on the same axis, and therefore, the cartridge is compact.

The holder may be divided into a plurality of portions. If the holder has a divided structure, assembly of the cartridge is facilitated.

An engagement portion to be detachably engaged with a tip end portion of the tape may be provided at the drum.

The maintenance person can easily attach a tip end of the tape to the drum, and can easily detach the tip end of the tape from the drum. Replacement of the tape and the tape reel is facilitated.

As described above, the maintenance person can easily replace the tape reel of the sheet storage device disclosed herein.

Hereinafter, an embodiment of a sheet storage device will be described with reference to the drawings. The sheet storage device described herein is an example.

FIG. 1 illustrates an external appearance of a banknote handling device 1. Later-described banknote storage devices 9 are attached to the banknote handling device 1. The banknote storage device 9 is an example of a type of sheet storage device.

The banknote handling device 1 is, for example, placed at a financial facility such as a bank. The banknote handling device 1 is, for example, placed on a teller counter of the bank. The banknote handling device 1 is a device configured to execute various transactions including a deposit transaction and a withdrawal transaction.

The banknote handling device 1 has a shape elongated in a front-back direction. The front of the banknote handling device 1 indicates a portion formed with an inlet 211 and an outlet 221 described later. The back of the banknote handling device 1 indicates a portion opposite to the portion formed with the inlet 211 and the outlet 221.

The banknote handling device 1 can be shared by two tellers upon use. The two tellers may be positioned on both right and left sides of the banknote handling device 1. Note that a right-left direction of the banknote handling device 1 is a direction perpendicular to the front-back direction. The left of the banknote handling device 1 is the left when facing the front of the banknote handling device 1, and the right of the banknote handling device 1 is the right when facing the front of the banknote handling device 1.

For example, the banknote handling device 1 can be placed at a back office of a store upon use, other than the banknote handling device 1 being placed at the financial facility.

Note that for the sake of easy understanding, each figure illustrates an X-axis, a Y-axis, and a Z-axis, a direction from the left to the right being taken as an X-axis positive direction, a direction from the front to the back being taken as a Y-axis positive direction, and a direction from a bottom to a top being taken as a Z-axis positive direction.

(Entire Configuration of Banknote Handling Device)

Figure 2:
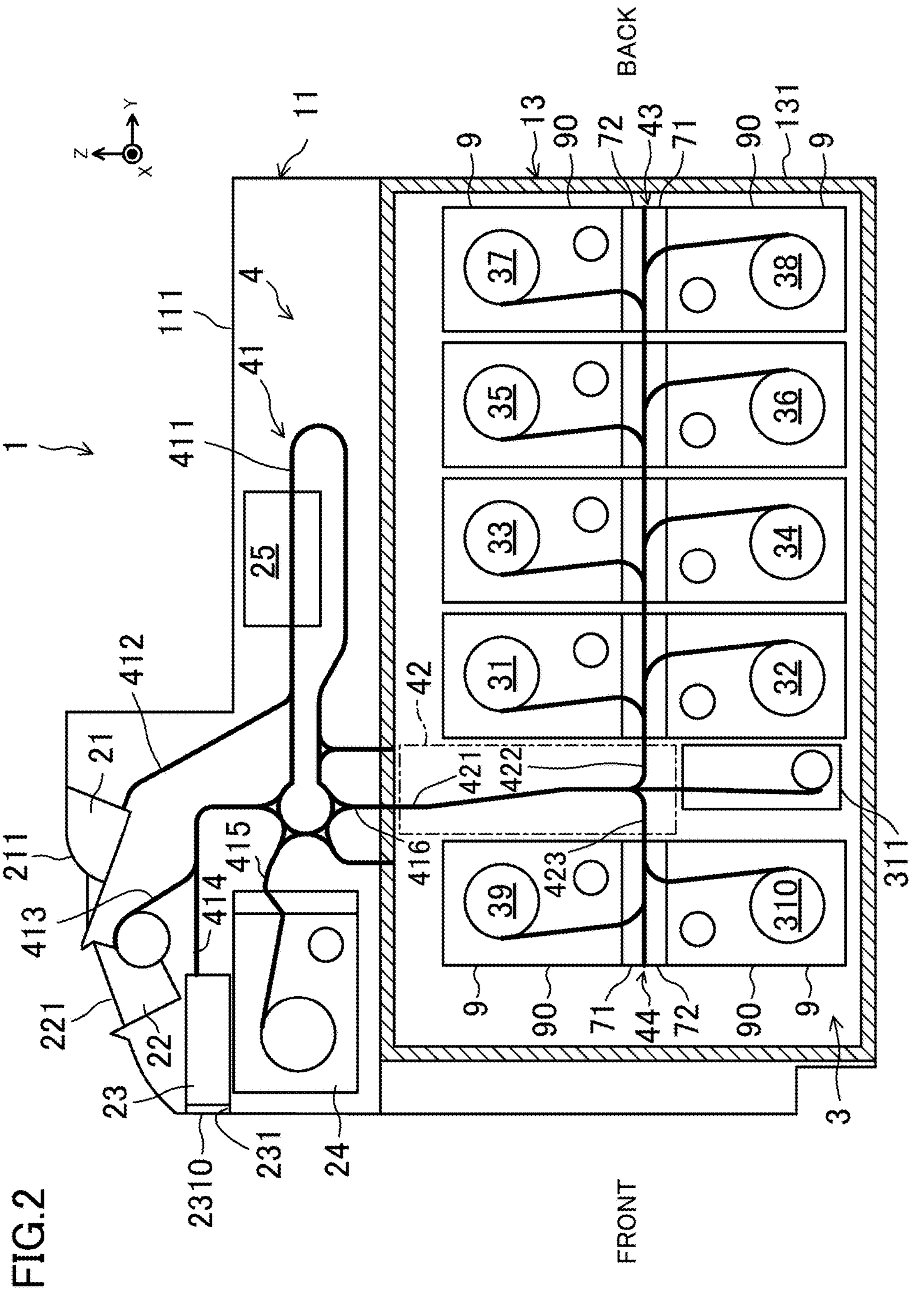
FIG. 2 is a view illustrating an internal structure of the banknote handling device.
Figure 3:
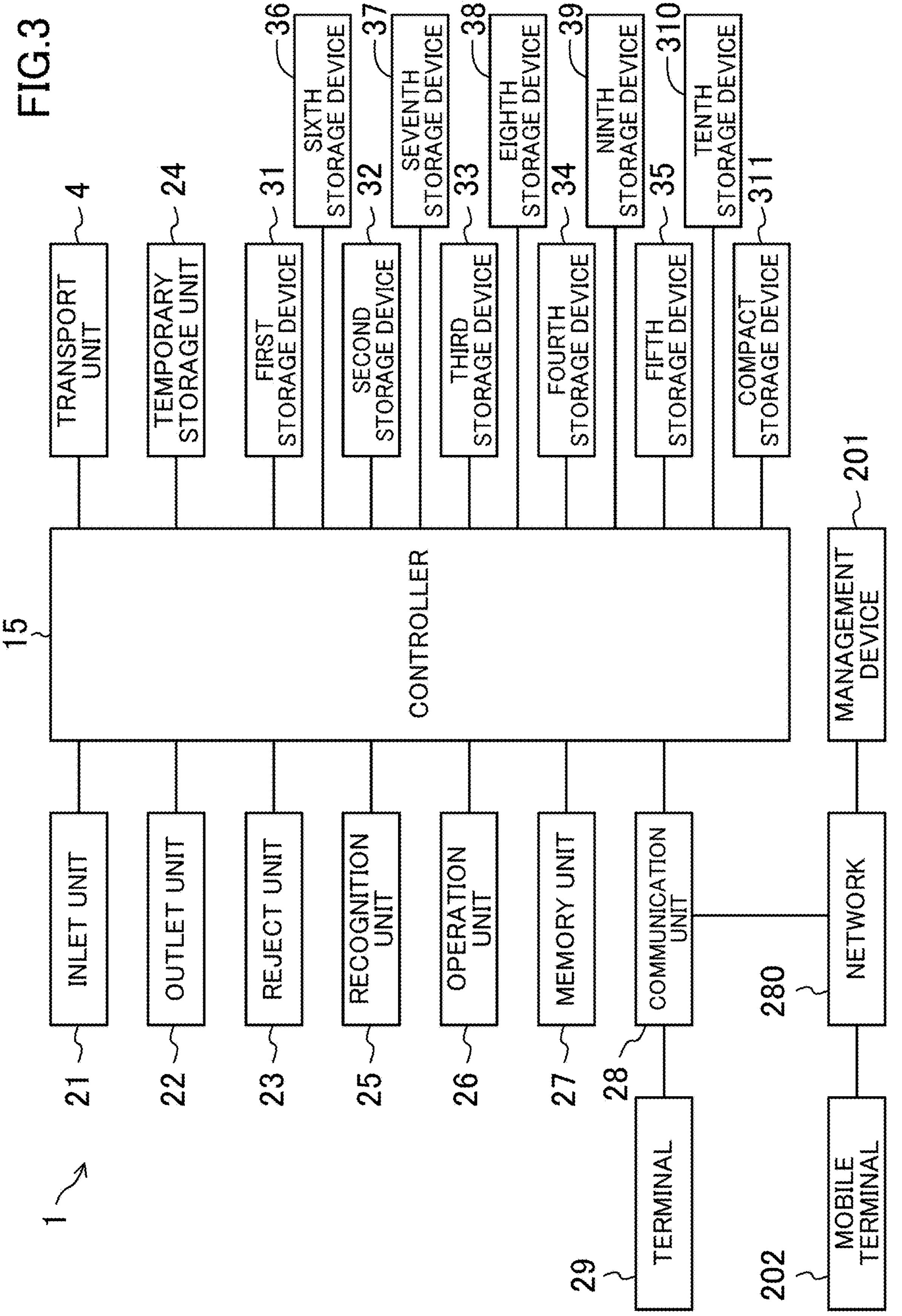
FIG. 3 is a block diagram illustrating a configuration of the banknote handling device.

FIG. 2 conceptually illustrates an internal structure of the banknote handling device 1. FIG. 3 is a block diagram illustrating a configuration of the banknote handling device 1. The banknote handling device 1 handles loose notes. The banknote handling device 1 has an upper handling unit 11 and a lower safe unit 13.

The handling unit 11 includes an upper housing 111. An inlet unit 21, an outlet unit 22, a reject unit 23, a temporary storage unit 24, a recognition unit 25, and an upper transport unit 41 are arranged in the upper housing 111. The upper transport unit 41 is part of a transport unit 4.

The safe unit 13 includes a safe housing 131. A plurality of storage devices 31 to 310, a compact storage device 311, a first lower transport unit 42, a second lower transport unit 43, and a third lower transport unit 44 are arranged in the safe housing 131. The first lower transport unit 42, the second lower transport unit 43, and the third lower transport unit 44 are part of the transport unit 4. The safe housing 131 protects the storage devices 31 to 311 at a security level of equal to or higher than a predetermined level. Specifically, the safe housing 131 is formed of a metal plate having a thickness of equal to or greater than a predetermined thickness. The security level of the safe housing 131 is higher than that of the upper housing 111.

The safe housing 131 has a door at a front portion or a back portion of the safe housing 131. When a maintenance person opens the door, the storage devices 31 to 311, the first lower transport unit 42, the second lower transport unit 43, and the third lower transport unit 44 can be drawn forward or backward from the safe housing 131.

The inlet unit 21 is, for example, a portion into which banknotes targeted for depositing are placed upon the deposit transaction. The inlet unit 21 has the inlet 211. The inlet 211 opens upwardly at a front portion of the upper housing 111. An operator places, with a hand, banknotes into the inlet unit 21 through the inlet 211. The inlet unit 21 can hold a plurality of banknotes with these banknotes overlapping with each other. The inlet unit 21 has a mechanism configured to feed banknotes into the banknote handling device 1 one by one.

The outlet unit 22 is, for example, a portion to which banknotes fed out of the storage devices 31 to 311 are transported upon the withdrawal transaction. Alternatively, the outlet unit 22 may be a portion to which rejected banknotes caused upon the deposit transaction are transported. The outlet unit 22 can hold a plurality of banknotes with these banknotes overlapping with each other. The outlet unit 22 has the outlet 221. The outlet 221 opens upwardly at a position in the front of the inlet 211. The operator can take out, with the hand, banknotes stacked in the outlet unit 22 through the outlet 221. Note that an openable slide shutter may be provided at the outlet 221.

The reject unit 23 is, for example, a portion to which rejected banknotes caused upon a count transaction are transported. Alternatively, the outlet unit 22 may be a portion to which rejected banknotes caused upon the deposit transaction are transported. The reject unit 23 is arranged at the front portion in the upper housing 111. The reject unit 23 is configured to hold a plurality of banknotes with these banknotes overlapping with each other. The reject unit 23 has a second outlet 231. The second outlet 231 opens forward at the front portion of the upper housing 111. A slide shutter 2310 is provided at the second outlet 231. As illustrated in FIG. 1, the shutter 2310 is provided at a front surface of the upper housing 111. When the shutter 2310 opens, the operator can take out banknotes stacked in the reject unit 23 through the second outlet 231. Note that instead of the slide shutter, a single swing door may be provided at the outlet 221 or the second outlet 231.

The temporary storage unit 24 temporarily stores banknotes targeted for depositing upon, e.g., the deposit transaction. The temporary storage unit 24 can feed out stored banknotes. The temporary storage unit 24 is arranged at a front position in the upper housing 111. The temporary storage unit 24 is arranged below the reject unit 23. The temporary storage unit 24 is a tape storage device. The temporary storage unit 24 winds banknotes around a drum together with tapes, thereby storing the banknotes. The tape storage device has an advantage that upon storage and feeding of banknotes, there is almost no change in the order of the banknotes. Moreover, the tape storage device also has an advantage that banknotes with various sizes can be stored in a mixed state. The temporary storage unit 24 can employ a well-known configuration of the tape storage device, but may have a configuration similar to those of the storage devices 31 to 310.

The recognition unit 25 is arranged on a later-described first transport path 411. For each of banknotes transported along the first transport path 411, the recognition unit 25 recognizes at least an authenticity, a denomination, and a fitness. Moreover, the recognition unit 25 acquires the serial number of each banknote.

The banknote handling device 1 has the first storage device 31, the second storage device 32, the third storage device 33, the fourth storage device 34, the fifth storage device 35, the sixth storage device 36, the seventh storage device 37, the eighth storage device 38, the ninth storage device 39, and the tenth storage device 310. The first storage device 31, the third storage device 33, the fifth storage device 35, the seventh storage device 37, and the ninth storage device 39 are arranged in the front-back direction in the safe housing 131. The second storage device 32, the fourth storage device 34, the sixth storage device 36, the eighth storage device 38, and the tenth storage device 310 are arranged in the front-back direction in the safe housing 131. Moreover, the first storage device 31, the third storage device 33, the fifth storage device 35, the seventh storage device 37, and the ninth storage device 39 are each mounted on the second storage device 32, the fourth storage device 34, the sixth storage device 36, the eighth storage device 38, and the tenth storage device 310. The first to tenth storage devices 31 to 310 and the later-described compact storage device 311 form a storage unit 3.

The first to tenth storage devices 31 to 310 are tape storage devices. Details of configurations of the first to tenth storage devices 31 to 310 will be described later. The first to tenth storage devices 31 to 310 may store different denominations of banknotes, for example.

The compact storage device 311 is arranged between the second storage device 32 and the tenth storage device 310. Moreover, the compact storage device 311 is arranged below the later-described first lower transport unit 42. The compact storage device 311 is a tape storage device.

The capacity of the compact storage device 311 is smaller than those of the first to tenth storage devices 31 to 310. The capacity of the compact storage device 311 may be about 100, for example. The compact storage device 311 can be utilized for various use applications. The compact storage device 311 may store counterfeit notes or banknotes suspected as counterfeit notes, for example.

In the banknote handling device 1, the transport unit 4 transports banknotes one by one at intervals. The transport unit 4 has a transport path. The transport path includes a combination of many rollers, a plurality of belts, motors configured to drive these components, and a plurality of guides. The transport unit 4 transports banknotes with a long-side edge of each banknote being on the front, for example. The transport unit 4 may transport banknotes with a short-side edge of each banknote being on the front.

The transport unit 4 has the upper transport unit 41, the first lower transport unit 42, the second lower transport unit 43, and the third lower transport unit 44. As described above, the upper transport unit 41 is arranged in the upper housing 111. The first lower transport unit 42, the second lower transport unit 43, and the third lower transport unit 44 are arranged in the safe housing 131. The upper transport unit 41 and the first lower transport unit 42 are connected to each other through a transport path formed at an upper wall forming the safe housing 131.

The upper transport unit 41 has the first transport path 411, a second transport path 412, a third transport path 413, a fourth transport path 414, a fifth transport path 415, and a sixth transport path 416.

The first transport path 411 is formed in a loop shape. The transport unit 4 transports banknotes in each of a clockwise direction (i.e., a forward direction) and a counterclockwise direction (i.e., a reverse direction) as viewed in FIG. 5 along the first transport path 411. The first transport path 411 transports banknotes such that the banknotes circulate.

The second transport path 412 connects the inlet unit 21 and the first transport path 411 to each other. The second transport path 412 transports banknotes from the inlet unit 21 to the first transport path 411.

The third transport path 413 connects the outlet unit 22 and the first transport path 411 to each other. The third transport path 413 transports banknotes from the first transport path 411 to the outlet unit 22. A diverting unit configured to change a banknote transport destination is provided at a location where the third transport path 413 and the first transport path 411 are connected to each other.

The fourth transport path 414 connects the reject unit 23 and a location in the middle of the third transport path 413 to each other. The fourth transport path 414 transports banknotes from the third transport path 413 to the reject unit 23. A diverting unit is provided at a location where the fourth transport path 414 and the third transport path 413 are connected to each other.

The fifth transport path 415 connects the temporary storage unit 24 and the first transport path 411 to each other. The fifth transport path 415 transports banknotes from the first transport path 411 to the temporary storage unit 24, and transports banknotes from the temporary storage unit 24 to the first transport path 411. A diverting unit is provided at a location where the fifth transport path 415 and the first transport path 411 are connected to each other.

The sixth transport path 416 connects the first lower transport unit 42 and the first transport path 411 to each other. The sixth transport path 416 transports banknotes from the first transport path 411 to the first lower transport unit 42, and transports banknotes from the first lower transport unit 42 to the first transport path 411. A diverting unit is provided at a location where the sixth transport path 416 and the first transport path 411 are connected to each other.

The first lower transport unit 42 is arranged above the compact storage device 311 between the first storage device 31 and the ninth storage device 39. The first lower transport unit 42 extends in a top-bottom direction. The first lower transport unit 42 has a seventh transport path 421. The seventh transport path 421 connects the compact storage device 311 and the upper transport unit 41 to each other. The seventh transport path 421 extends in the top-bottom direction. The seventh transport path 421 transports banknotes from the upper transport unit 41 to the compact storage device 311, and transports banknotes from the compact storage device 311 to the upper transport unit 41.

Moreover, the seventh transport path 421 has a diverged path 422 and a diverged path 423. A diverting unit is arranged at a diverging location of the diverged path 422 and the diverged path 423.

The second lower transport unit 43 is formed among the first, third, fifth, and seventh storage devices 31, 33, 35, 37 and the second, fourth, sixth, and eighth storage devices 32, 34, 36, 38. The second lower transport unit 43 extends in the front-back direction. The second lower transport unit 43 transports banknotes in the front-back direction. The second lower transport unit 43 is connected to the diverged path 422. The first to eighth storage devices 31 to 38, more specifically later-described transport modules 71, 72, each have diverting units. Each diverting unit draws, into the corresponding storage device, banknotes transported by the second lower transport unit 43. Moreover, each diverting unit feeds, to the second lower transport unit 43, banknotes fed out of the corresponding storage device.

The third lower transport unit 44 is formed between the ninth storage device 39 and the tenth storage device 310. The third lower transport unit 44 extends in the front-back direction. The third lower transport unit 44 transports banknotes in the front-back direction. The third lower transport unit 44 is connected to the diverged path 423. The ninth and tenth storage devices 39, 310, i.e., the transport modules 71, 72, each have diverting units. Each diverting unit draws, into the corresponding storage device, banknotes transported by the third lower transport unit 44. Moreover, each diverting unit feeds, to the third lower transport unit 44, banknotes fed out of the corresponding storage device.

Note that a configuration of the storage unit 3 in the banknote handling device 1 of FIG. 2 is one example. The number of storage devices housed in the safe housing 131, arrangement of the storage devices, and the structure of each storage device are not limited to those in the configuration of FIG. 2.

As illustrated in FIG. 3, the banknote handling device 1 includes a controller 15. The inlet unit 21, the outlet unit 22, the reject unit 23, the temporary storage unit 24, the recognition unit 25, the transport unit 4, the first storage device 31, the second storage device 32, the third storage device 33, the fourth storage device 34, the fifth storage device 35, the sixth storage device 36, the seventh storage device 37, the eighth storage device 38, the ninth storage device 39, the tenth storage device 310, and the compact storage device 311 are connected to the controller 15 so that signals can be exchanged there among.

The banknote handling device 1 has an operation unit 26 to be operated by the operator, a memory unit 27 configured to store various types of data etc., and a communication unit 28 configured to communicate with a terminal 29. The operation unit 26, the memory unit 27, and the communication unit 28 are also connected to the controller 15 so that signals can be exchanged there among. The terminal 29 is operated by the operator (e.g., the teller) for executing various transactions by means of the banknote handling device 1.

Moreover, the communication unit 28 is connected to a management device 201 and a mobile terminal 202 via a network 280. The management device 201 may be a device configured to manage a bank system. The management device 201 is, for example, placed at a location apart from an installation location of the banknote handling device 1. The mobile terminal 202 is, for example, a tablet terminal or a smartphone. The mobile terminal 202 is, for example, a terminal carried by a manager of the bank.

The controller 15 controls the inlet unit 21, the outlet unit 22, the reject unit 23, the temporary storage unit 24, the recognition unit 25, the transport unit 4, the first storage device 31, the second storage device 32, the third storage device 33, the fourth storage device 34, the fifth storage device 35, the sixth storage device 36, the seventh storage device 37, the eighth storage device 38, the ninth storage device 39, the tenth storage device 310, and the compact storage device 311 such that various transactions are executed when the operator operates the operation unit 26 or operates the terminal 29. Hereinafter, operation when the banknote handling device 1 executes various transactions will be described. A structural configuration of controller 15 is described below with respect to FIG. 17.

(Deposit Transaction)

The banknote handling device 1 stores banknotes in the storage devices upon the deposit transaction. The operator places banknotes targeted for depositing into the inlet unit 21. The inlet unit 21 feeds the banknotes into the device one by one. The transport unit 4 transports the banknotes to the recognition unit 25. The recognition unit 25 recognizes the banknotes. According to a recognition result of the recognition unit 25, the transport unit 4 transports each banknote to the first storage device 31, the second storage device 32, the third storage device 33, the fourth storage device 34, the fifth storage device 35, the sixth storage device 36, the seventh storage device 37, the eighth storage device 38, the ninth storage device 39, the tenth storage device 310, or the compact storage device 311. The storage devices 31 to 311 store the banknotes. Note that the transport unit 4 transports, to the outlet unit 22 or the reject unit 23, banknotes recognized as rejected banknotes.

When all of the banknotes placed into the inlet unit 21 are fed into the banknote handling device 1, e.g., the terminal 29 displays a deposit amount. When the operator operates the terminal 29 or operates the operation unit 26 to accept the deposit transaction, the deposit transaction ends. The controller 15 causes the memory unit 27 to store data on the deposit transaction, such as the denominations of the deposited banknotes and the number of deposited banknotes. Moreover, the controller 15 updates data on the inventory amount of the banknotes stored in the storage devices 31 to 311, and causes the memory unit 27 to store such an inventory amount. Further, the controller 15 adds, to a serial number list in the memory unit 27, data on the serial numbers of the banknotes stored in the storage devices 31 to 311.

Note that in a case where the temporary storage unit 24 is utilized upon the deposit transaction, the transport unit 4 transports the banknotes having passed through the recognition unit 25 to the temporary storage unit 24. The temporary storage unit 24 stores the banknotes. After all of the banknotes placed into the inlet unit 21 have been fed into the banknote handling device 1, e.g., the terminal 29 displays the deposit amount. The operator operates the terminal 29 or operates the operation unit 26 so that acceptance of the deposit transaction or cancellation of the deposit transaction can be selected. In a case where the operator accepts the deposit transaction, the transport unit 4 transports each banknote fed out of the temporary storage unit 24 to the first storage device 31, the second storage device 32, the third storage device 33, the fourth storage device 34, the fifth storage device 35, the sixth storage device 36, the seventh storage device 37, the eighth storage device 38, the ninth storage device 39, the tenth storage device 310, or the compact storage device 311. The storage devices 31 to 311 store the banknotes. In a case where the operator cancels the deposit transaction, the transport unit 4 transports the banknotes fed out of the temporary storage unit 24 to the outlet unit 22. The banknotes targeted for depositing are returned.

(Withdrawal Transaction)

The banknote handling device 1 ejects banknotes from the banknote handling device 1 upon the withdrawal transaction. The storage devices 31 to 311 feed out the banknotes targeted for withdrawal. The transport unit 4 transports the banknotes to the recognition unit 25. The recognition unit 25 recognizes the banknotes. The transport unit 4 transports the recognized banknotes to the outlet unit 22. The outlet unit 22 holds the banknotes targeted for withdrawal. The transport unit 4 transports, to the reject unit 23, banknotes recognized as rejected banknotes by the recognition unit 25. The reject unit 23 stores the rejected banknotes. When all of the banknotes targeted for withdrawal are withdrawn to the outlet unit 22, the withdrawal transaction ends. The controller 15 causes the memory unit 27 to store data on the withdrawal transaction, such as the denominations of the withdrawn banknotes and the number of withdrawn banknotes. Moreover, the controller 15 updates data on the inventory amount of the banknotes stored in the storage devices 31 to 311, and causes the memory unit 27 to store such an inventory amount. Further, the controller 15 deletes, from the serial number list in the memory unit 27, data on the serial numbers of the banknotes fed out of the storage devices 31 to 311.

(Configuration Example of Banknote Storage Device)

(Configuration Example of Storage Mechanism)

Figure 4:
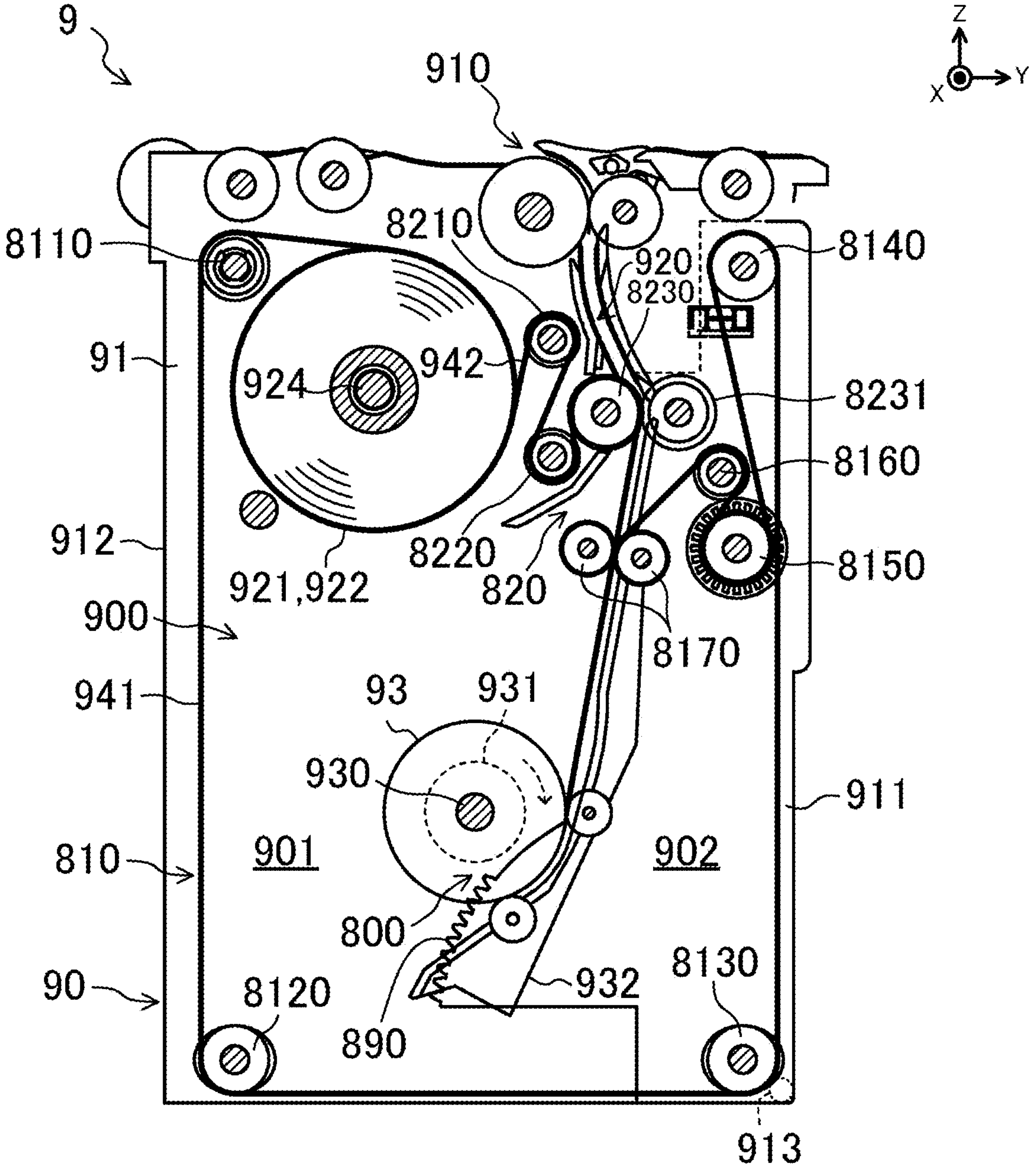
FIG. 4 is a sectional view illustrating a configuration example of a banknote storage device.
Figure 5:
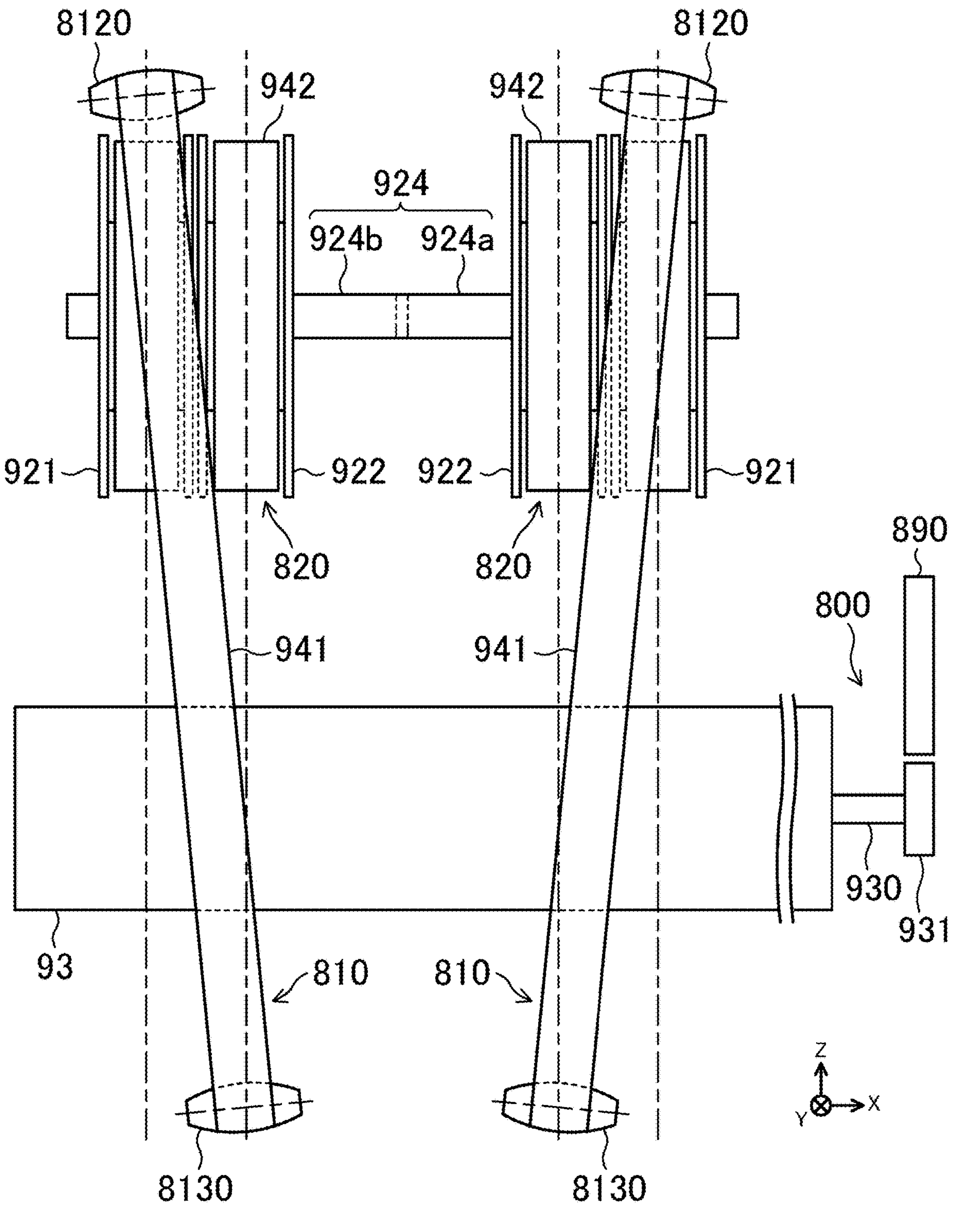
FIG. 5 is a view illustrating a configuration of a tape path of the banknote storage device.
Figure 6:
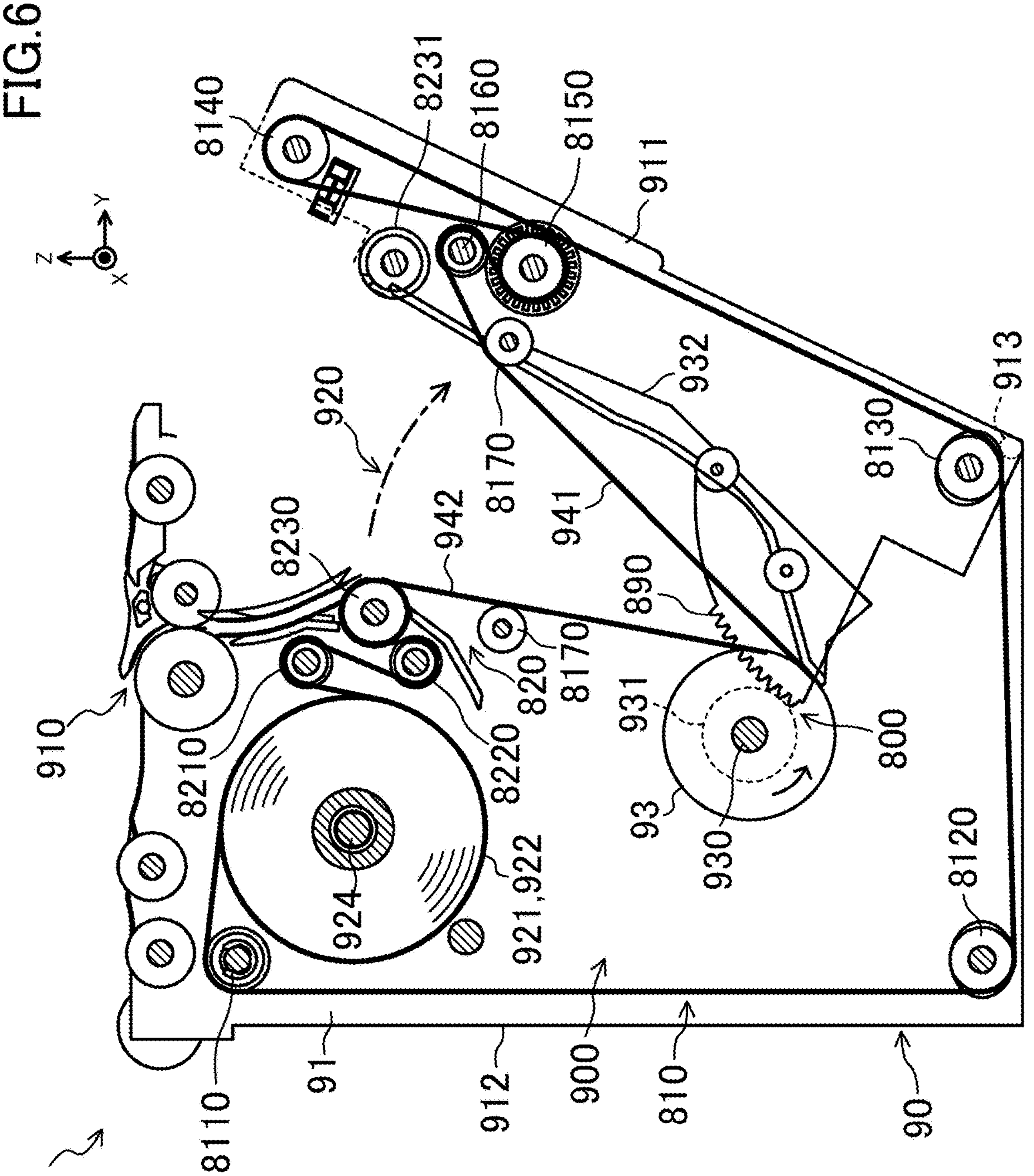
FIG. 6 is a view illustrating a state in which a transport path of the banknote storage device opens.

Next, the configurations of the first to tenth storage devices 31 to 310 will be described with reference to the drawings. FIGS. 4 to 6 illustrate the configuration of the second storage device 32, for example. Note that the configurations of the first to tenth storage devices 31 to 310 are substantially the same as each other. Hereinafter, the first to tenth storage devices 31 to 310 will be collectively referred to as the banknote storage device 9.

FIG. 4 illustrates a state in which no banknotes are stored in the banknote storage device 9. An outlet/inlet 910 through which banknotes are fed in or out is provided at an upper surface of the banknote storage device 9. The outlet/inlet 910 is provided at the later-described transport module 71, 72. The outlet/inlet 910 is adjacent to the diverting unit provided at the transport module 71, 72.

The banknote storage device 9 includes a storage mechanism 900 and a frame 91 housing the storage mechanism 900. The storage mechanism 900 and the frame 91 form a housing module 90 of the banknote storage device 9. The housing module 90 will be described later in detail.

The storage mechanism 900 is configured to wind up, together with tapes, banknotes sandwiched by the tapes around a drum 93. The storage mechanism 900 includes two first reels 921, two second reels 922, and the drum 93. Note that in FIG. 4, only one reel is illustrated. This is because the positions of the total four reels are shifted from each other in the X-axis direction and are the same as each other in the Y-axis direction and the Z-axis direction.

Base ends of first tapes 941 are fixed to the first reels 921, and the first tapes 941 are wound around the first reels 921. Base ends of second tapes 942 are fixed to the second reels 922, and the second tapes 942 are wound around the second reels 922. Tip ends of the first tapes 941 and tip ends of the second tapes 942 are joined to an outer peripheral surface of the drum 93.

The first tapes 941 drawn out of the first reels 921 and the second tapes 942 drawn out of the second reels 922 are wound around the outer peripheral surface of the drum 93 with the first tapes 941 and the second tapes 942 overlapping with each other. Banknotes are sandwiched by the first tapes 941 and the second tapes 942.

The drum 93 rotates in the direction of winding up banknotes and the tapes and the direction of feeding out banknotes and the tapes. In an example of FIG. 4, the direction of winding up banknotes and the tapes by the drum 93 is the clockwise direction, and the direction of feeding out banknotes and the tapes by the drum 93 is the counterclockwise direction.

A transport path 920 is formed between the outlet/inlet 910 and the drum 93. The transport path 920 includes a pair of rollers, a fixed guide member, and a later-described movable guide 932. Banknotes are, along the transport path 920, transported in a direction from the outlet/inlet 910 to the drum 93 or a direction from the drum 93 to the outlet/inlet 910.

The frame 91 has a first frame portion 911 and a second frame portion 912. The first frame portion 911 is, at the position of a pivot shaft 913, supported pivotably relative to the second frame portion 912. The pivot shaft 913 is positioned at an end portion of a lower end portion of the banknote storage device 9 in the Y-axis positive direction. The pivot shaft 913 is, at the end portion of the banknote storage device 9 on a side farther from the outlet/inlet 910, positioned at the end portion on the opposite side of the transport path 920 and an extension thereof from the drum 93. As illustrated in FIG. 6, when the first frame portion 911 turns about the pivot shaft 913, the transport path 920 from the outlet/inlet 910 to the drum 93 opens.

The second frame portion 912 supports a shaft 930 of the drum 93. The axis of the drum 93 extends in the X-axis direction as illustrated in FIG. 5.

In the banknote storage device 9, the two first reels 921 and the two second reels 922 are arranged on the same axis. That is, the positions of the first reels 921 and the second reels 922 are shifted from each other in the X-axis direction, and are the same as each other in the Y-axis direction and the Z-axis direction. A shaft 924 supporting the first reels 921 and the second reels 922 is supported by the second frame portion 912. The shaft 924 extends in the X-axis direction. The axis of the drum 93 is parallel with the axes of the first reels 921 and the second reels 922.

The shaft 924 supports the two first reels 921 and the two second reels 922 such that these four reels rotate independently of each other. The four reels are arranged on the same axis so that the banknote storage device 9 can save a space for arranging the reels. The banknote storage device 9 can be reduced in size without the need for decreasing a banknote storage amount. Note that as described later, the shaft 924 includes a first shaft **924*a* and a second shaft 924*b* (see chain double-dashed lines in FIG. 5). The first shaft 924*a* and the second shaft 924*b*** are arranged on the same axis.

The two first reels 921 are arranged with a clearance in the X-axis direction. The two second reels 922 are also arranged with a clearance in the X-axis direction. Of a pair of the single first reel 921 and the single second reel 922 arranged on the left side as viewed in the plane of paper of FIG. 5, the second reel 922 is arranged on a center side in the X-axis direction in the banknote storage device 9, and the first reel 921 is arranged on an outer side in the X-axis direction in the banknote storage device 9. Similarly, of a pair of the single first reel 921 and the single second reel 922 arranged on the right side as viewed in the plane of paper of FIG. 5, the second reel 922 is arranged on the center side in the X-axis direction in the banknote storage device 9, and the first reel 921 is arranged on the outer side in the X-axis direction in the banknote storage device 9.

The first tape 941 drawn out of the first reel 921 runs along a first tape path 810, thereby reaching the drum 93. The first tape path 810 includes a first tape pulley 8110, a second tape pulley 8120, a third tape pulley 8130, a fourth tape pulley 8140, a fifth tape pulley 8150, a sixth tape pulley 8160, and a pair of seventh tape pulleys 8170. The first tape path 810 is formed to bypass the drum 93. Note that two first tape pulleys 8110, two second tape pulleys 8120, two third tape pulleys 8130, two fourth tape pulleys 8140, two fifth tape pulleys 8150, two sixth tape pulleys 8160, and two pairs of seventh tape pulleys 8170 are present corresponding to the two first tapes 941.

The first tape pulley 8110 and the second tape pulley 8120 are attached to the second frame portion 912. The third tape pulley 8130, the fourth tape pulley 8140, the fifth tape pulley 8150, the sixth tape pulley 8160, and one pulley of the pair of seventh tape pulleys 8170 is attached to the first frame portion 911. The first frame portion 911 forms part of the first tape path 810.

Each second tape pulley 8120 changes a running direction of the first tape 941 between the Z-axis direction and the Y-axis direction. Moreover, as illustrated in FIG. 5, the axis of rotation of each second tape pulley 8120 is inclined. More specifically, each second tape pulley 8120 is, in the X-axis direction, arranged at the same position or substantially the same position as an arrangement position of the first reel 921. The axis of rotation of each second tape pulley 8120 is inclined such that the outer side in the X-axis direction is lower and the center side in the X-axis direction is higher. The axis of rotation of the second tape pulley 8120 arranged on the left as viewed in the plane of paper of FIG. 5 extends upwardly to the right. The axis of rotation of the second tape pulley 8120 arranged on the right as viewed in the plane of paper of FIG. 5 extends downwardly to the right.

Each third tape pulley 8130 changes the running direction of the first tape 941 between the Y-axis direction and the Z-axis direction. As illustrated in FIG. 5, the axis of rotation of each third tape pulley 8130 is also inclined. Each third tape pulley 8130 is, in the X-axis direction, arranged at the same position or substantially the same position as an arrangement position of the second reel 922. The axis of rotation of each third tape pulley 8130 is parallel with the axis of rotation of the second tape pulley 8120. That is, the axis of rotation of each third tape pulley 8130 is inclined such that the outer side in the X-axis direction is lower and the center side in the X-axis direction is higher. The axis of rotation of the third tape pulley 8130 arranged on the left as viewed in the plane of paper of FIG. 5 extends upwardly to the right. The axis of rotation of the third tape pulley 8130 arranged on the right as viewed in the plane of paper of FIG. 5 extends downwardly to the right.

The first tapes 941 drawn out of the first reels 921 are wound around the second tape pulleys 8120 and the third tape pulleys 8130, and therefore, the positions thereof in the X-axis direction change from the position of the first reel 921 to the position of the second reel 922. Thereafter, the first tapes 941 are, as described above, wound around the fourth tape pulleys 8140, the fifth tape pulleys 8150, and the sixth tape pulleys 8160, and reach the pairs of seventh tape pulleys 8170. At this point, the first tapes 941 are, in the X-axis direction, at the same positions as those of the second tapes 942.

The second tape 942 drawn out of the second reel 922 runs along a second tape path 820, thereby reaching the drum 93. The second tape path 820 includes an eighth tape pulley 8210, a ninth tape pulley 8220, a tenth tape pulley 8230, and the pair of seventh tape pulleys 8170. Two eighth tape pulleys 8210, two ninth tape pulleys 8220, and two tenth tape pulleys 8230 are also present corresponding to the two second tapes 942.

The eighth tape pulley 8210, the ninth tape pulley 8220, the tenth tape pulley 8230, and one pulley of the pair of seventh tape pulleys 8170 is attached to the second frame portion 912. The second frame portion 912 forms part of the second tape path 820.

The pairs of seventh tape pulleys 8170 guide the first tapes 941 and the second tapes 942 to the outer peripheral surface of the drum 93 with the first tapes 941 and the second tapes 942 overlapping with each other. Banknotes are sandwiched by the first tapes 941 and the second tapes 942 at the position of the pairs of seventh tape pulleys 8170.

When the drum 93 is rotated forward by drive of a later-described drum motor 96, banknotes sandwiched by the first tapes 941 and the second tapes 942 are, together with the first tapes 941 and the second tapes 942, wound up around the outer peripheral surface of the drum 93. The banknote storage device 9 stores the banknotes. At this point, the first reels 921 and the second reels 922 may be also rotated forward by drive of a later-described reel motor 95, thereby operating to feed out the tapes.

Conversely, the first tapes 941 drawn out of the drum 93 are wound around the third tape pulleys 8130 and the second tape pulleys 8120, and therefore, the positions thereof in the X-axis direction change from the position of the second reel 922 to the position of the first reel 921. Thereafter, the first tapes 941 reach the first reels 921 through the first tape pulleys 8110.

When the first reels 921 and the second reels 922 are rotated backward by drive of the reel motor 95 and the drum 93 is rotated backward by drive of the drum motor 96, banknotes sandwiched by the first tapes 941 and the second tapes 942 are, together with the first tapes 941 and the second tapes 942, fed out of the outer peripheral surface of the drum 93. Thereafter, the banknotes are fed out of the banknote storage device 9 through the outlet/inlet 910 by way of the transport path 920.

One pulley of the pair of seventh tape pulleys 8170 is more specifically attached to the movable guide 932. The movable guide 932 guides the first tapes 941, the second tapes 942, and banknotes to the drum 93.

The movable guide 932 is supported by the first frame portion 911. A base end portion, i.e., an upper end portion as viewed in FIG. 4, of the movable guide 932 is turnably attached to the first frame portion 911. The movable guide 932 turns about a pivot point in the vicinity of pulleys 8231 arranged facing the tenth tape pulleys 8230. The movable guide 932 is biased in the clockwise direction as viewed in FIG. 4 by a not-shown biasing member (e.g., a spring). The movable guide 932 turns in the clockwise direction and the counterclockwise direction according to the diameter of the drum 93.

Arrangement of the first reels 921, the second reels 922, the drum 93, and the movable guide 932 will be described herein. As illustrated in FIG. 4, the transport path 920 extends downwardly from an upper end portion of the banknote storage device 9. The transport path 920 extends from the outlet/inlet 910 to the drum 93. The movable guide 932 extends in the top-bottom direction along the transport path 920. The transport path 920 (or the movable guide 932) divides, in the Y-axis direction, the inside of the banknote storage device 9 into two regions. That is, the banknote storage device 9 has a first region 901 in a Y-axis negative direction with respect to the transport path 920 and a second region 902 in the Y-axis positive direction with respect to the transport path 920.

The drum 93 is arranged in the first region 901. More specifically, the drum 93 is arranged at a lower portion in the first region 901. The "lower portion" described herein means a lower portion when the inside of the banknote storage device 9 is divided in half into an upper portion and the lower portion.

The first reels 921 and the second reels 922 are also arranged in the first region 901. The drum 93, the first reels 921, and the second reels 922 are arranged on the same side with respect to the movable guide 932.

More specifically, the first reels 921 and the second reels 922 are arranged at the upper portion in the first region 901. As in description above, the "upper portion" described herein means the upper portion when the inside of the banknote storage device 9 is divided in half into the upper portion and the lower portion. The first reels 921 and the second reels 922 are arranged above the drum 93 in the first region 901. That is, in the first region 901, the first reels 921 and the second reels 922 are positioned closer to the outlet/inlet 910 than the drum 93 is to.

The drum 93, the first reels 921, and the second reels 922 are arranged on the same side with respect to the movable guide 932 so that the banknote storage device 9 can be compactified while the storage amount of the banknote storage device 9 is increased. Compactification of the banknote storage device 9 is advantageous in reduction in the size of the banknote handling device 1, and an increase in the capacity of the banknote storage device 9 is advantageous in an increase in the capacity of the banknote handling device 1.

(Configuration for Preventing Looseness of Tapes)

The banknote storage device 9 is configured to wind up the tapes when the opening transport path 920 is closed. The banknote storage device 9 includes a drive mechanism 800 configured to prevent looseness of the tapes. As illustrated in FIGS. 4 to 6, the drive mechanism 800 has a drum gear 931 and a frame gear 890. The drum gear 931 is attached to the shaft 930 of the drum 93. The frame gear 890 is attached to the first frame portion 911.

The frame gear 890 does not engage with the drum gear 931 in a state in which the first frame portion 911 and the second frame portion 912 form the transport path 920, i.e., a use state of the banknote storage device 9 illustrated in FIG. 4. When the first frame portion 911 turns about the pivot shaft 913, the frame gear 890 turns about the pivot shaft 913, thereby engaging with the drum gear 931 as illustrated in FIG. 6. When the first frame portion 911 further turns, the frame gear 890 and the drum gear 931 disengage from each other.

The drum gear 931 is attached to the shaft 930 of the drum 93. The axis of the drum gear 931 is coincident with the axis of the drum 93. A not-shown one-way clutch is interposed between the drum gear 931 and the drum 93. When the drum gear 931 rotates in the clockwise direction as viewed in FIGS. 4 and 6, the one-way clutch transmits rotary force to the drum 93, thereby rotating the drum 93 in the clockwise direction. When the drum gear 931 rotates in the counterclockwise direction as viewed in FIGS. 4 and 6, the one-way clutch does not transmit rotary force to the drum 93, thereby not rotating the drum 93. The drum gear 931 idles.

The frame gear 890 is part of a gear about the pivot shaft 913. When the first frame portion 911 turns relative to the second frame portion 912 in the clockwise direction as indicated by an arrow of a chain line in FIG. 6, the frame gear 890 turns about the pivot shaft 913, thereby engaging with the drum gear 931. When the frame gear 890 and the drum gear 931 engage with each other, the drum gear 931 rotates in the counterclockwise direction as indicated by an arrow in FIG. 6. In this case, the above-described one-way clutch idles the drum gear 931, and therefore, the drum 93 does not rotate. When an attempt is made to manually rotate the drum 93 in the counterclockwise direction, the drum gear 931 tends to rotate together due to action of the one-way clutch. However, the frame gear 890 engages with the drum gear 931, and therefore, the drum 93 cannot be rotated beyond a rotation amount of the drum gear 931.

At this point, the first frame portion 911 turns together with part of the first tape path 810, and therefore, there is no change or almost no change in the length of the first tape path 810. Thus, when the transport path 920 is opened, looseness of the first tapes 941 is reduced. Moreover, when the transport path 920 is opened, rotation of the drum 93 is reduced, and therefore, looseness of the second tapes 942 supported by the second frame portion 912 is also reduced.

When the first frame portion 911 further turns in the clockwise direction, the frame gear 890 moves in a direction apart from the drum 93, and a state in which the frame gear 890 and the drum gear 931 do not engage with each other is brought. When an attempt is made to manually rotate the drum 93 in the counterclockwise direction, the drum gear 931 tends to rotate together due to action of the one-way clutch. Since the frame gear 890 does not engage with the drum gear 931, the drum 93 can be rotated. In a case where the first frame portion 911 is turned beyond a predetermined angle, the drum 93 is rotated so that jammed banknotes can be removed.

When the first frame portion 911 is, for closing the opening transport path 920, turned relative to the second frame portion 912 in the counterclockwise direction as viewed in FIG. 6, the frame gear 890 turns about the pivot shaft 913 in the counterclockwise direction. The drum gear 931 engaging with the frame gear 890 rotates in the clockwise direction. Accordingly, the drum 93 rotates in the direction of winding up the first tapes 941 and the second tapes 942 as indicated by a dashed arrow in FIG. 4.

At this point, a not-shown reduction member reduces rotation of the first reels 921 and the second reels 922. Accordingly, the first tapes 941 and the second tapes 942 are pulled, and looseness of the first tapes 941 and the second tapes 942 is reduced. The reduction member may be a mechanical member configured to stop rotation of the first reels 921 and the second reels 922. Alternatively, the reduction member may be torque limiters provided at the first reels 921 and the second reels 922. Alternatively, the reduction member may utilize holding torque of the motor configured to drive the first reels 921 and the second reels 922.

The frame gear 890 does not engage with the drum gear 931 in the use state of the banknote storage device 9, and therefore, no influence is on rotation of the drum 93. The drive mechanism 800 can avoid, upon use of the banknote storage device 9, an increase in the load of the motor configured to rotate the drum 93.

(Module Configuration of Storage Device)

Figure 7:
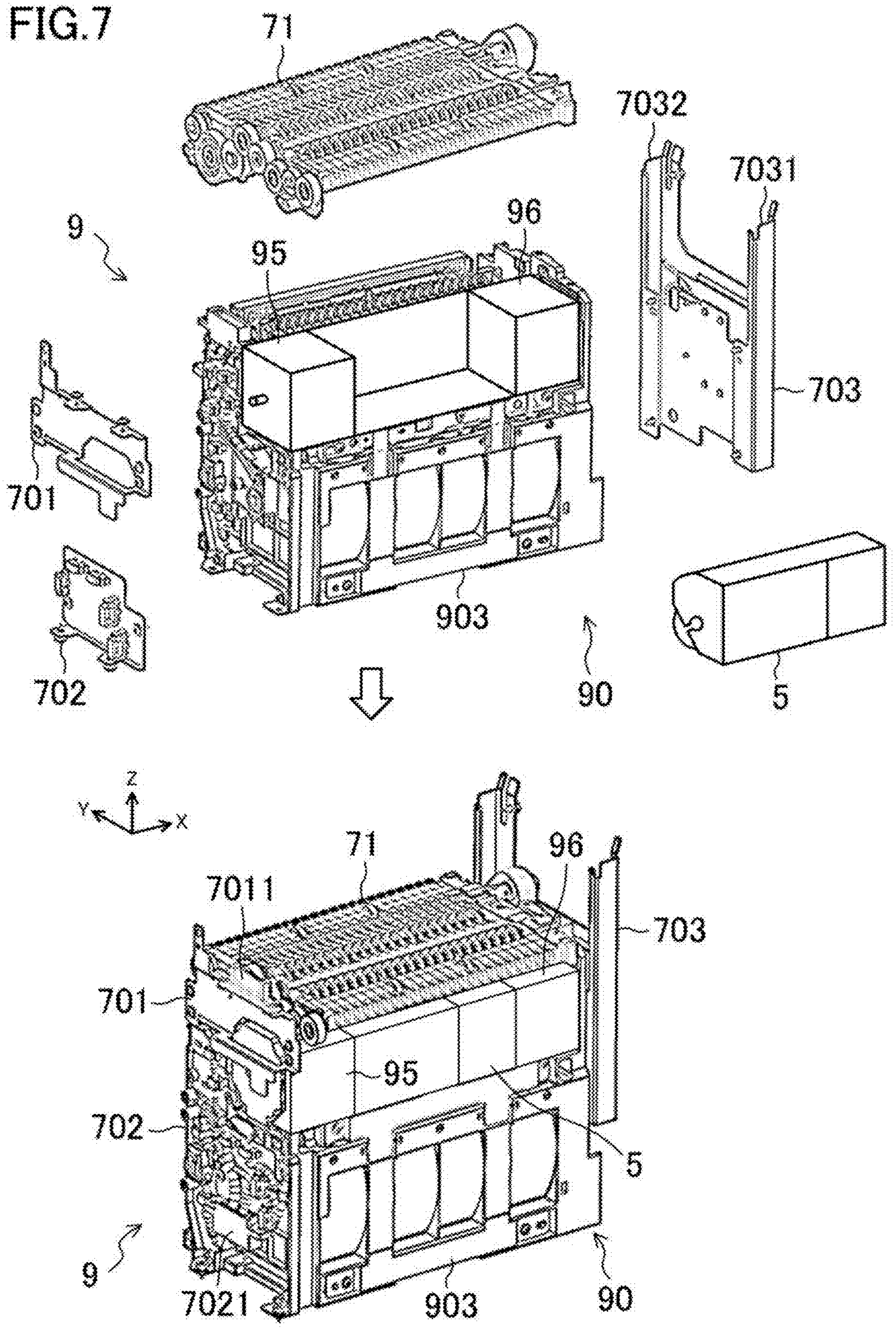
FIG. 7 is an exploded perspective view of the banknote storage device.

FIG. 7 illustrates an exploded perspective view of the banknote storage device 9. Note that FIG. 7 corresponds to the second storage device 32. The directions of the X-axis, the Y-axis, and the Z-axis illustrated in FIG. 7 indicate directions in a state in which the second storage device 32 is attached to the banknote handling device 1.

The banknote storage device 9 includes the above-described housing module 90. In the banknote storage device 9, the transport module 71, a first bracket 701, a second bracket 702, and an attachment 703 are attached to the housing module 90.

The housing module 90 includes a body 903 having the frame 91 and the drum 93 as described above and a cartridge 5 detachably attached to the body 903.

The transport module 71 is attached to an upper end portion of the housing module 90. The outlet/inlet 910 of the banknote storage device 9 is formed at the transport module 71, 72. The transport module 71 is attached to an outlet/inlet 910 side of the banknote storage device 9. The transport module 71 forms part of the second lower transport unit 43 or the third lower transport unit 44. That is, as illustrated in FIG. 2, another banknote storage device 9 facing the banknote storage device 9 in the top-bottom direction also has another transport module 72. The two transport modules 71, 72 face each other in the top-bottom direction, and therefore, the second lower transport unit 43 or the third lower transport unit 44 is formed between the two transport modules 71, 72.

The transport module 71, 72 has the diverting unit. The diverting unit draws, into the banknote storage device 9, banknotes transported along the second lower transport unit 43 or the third lower transport unit 44. Moreover, the diverting unit feeds, to the second lower transport unit 43 or the third lower transport unit 44, banknotes fed out of the banknote storage device 9. The diverting unit forms part of the outlet/inlet 910 of the banknote storage device 9.

Each of the first bracket 701 and the second bracket 702 is attached to a side surface of the housing module 90 in an X-axis negative direction. The second bracket 702 supports a connector 7021. The connector 7021 is a connector for supply power to the banknote storage device 9 or a connector for transmitting a signal to the banknote storage device 9.

The attachment 703 is a member configured to couple, to the banknote storage device 9, another banknote storage device 9 arranged facing the banknote storage device 9 in the top-bottom direction. The attachment 703 is attached to a side surface of the housing module 90 in the X-axis positive direction. The attachment 703 illustrated as an example in FIG. 7 has two rails 7031, 7032. Each of the rails 7031, 7032 has a U-shaped cross section, and extends in the top-bottom direction. The two rails 7031, 7032 are each positioned at front and back ends of the housing module 90. Note that the front end is an end in the Y-axis negative direction and the back end is an end in the Y-axis positive direction. The rail 7031 at the front end and the rail 7032 at the back end are arranged facing each other in the front-back direction. An attachment of another banknote storage device 9 has such a shape that the attachment is positioned inside the rails 7031, 7032 having the U-shaped cross sections and slides in the top-bottom direction along the rails 7031, 7032. The attachments engage with each other to determine the positions of the banknote storage device 9 and another banknote storage device 9.

(Arrangement of Cartridge)

As described above, the cartridge 5 is detachably attached to the body 903 of the banknote storage device 9. The maintenance person replaces the cartridge 5 so that the tapes 941, 942 and the reels 921, 922 of the banknote storage device 9 can be easily replaced.

Figure 8:
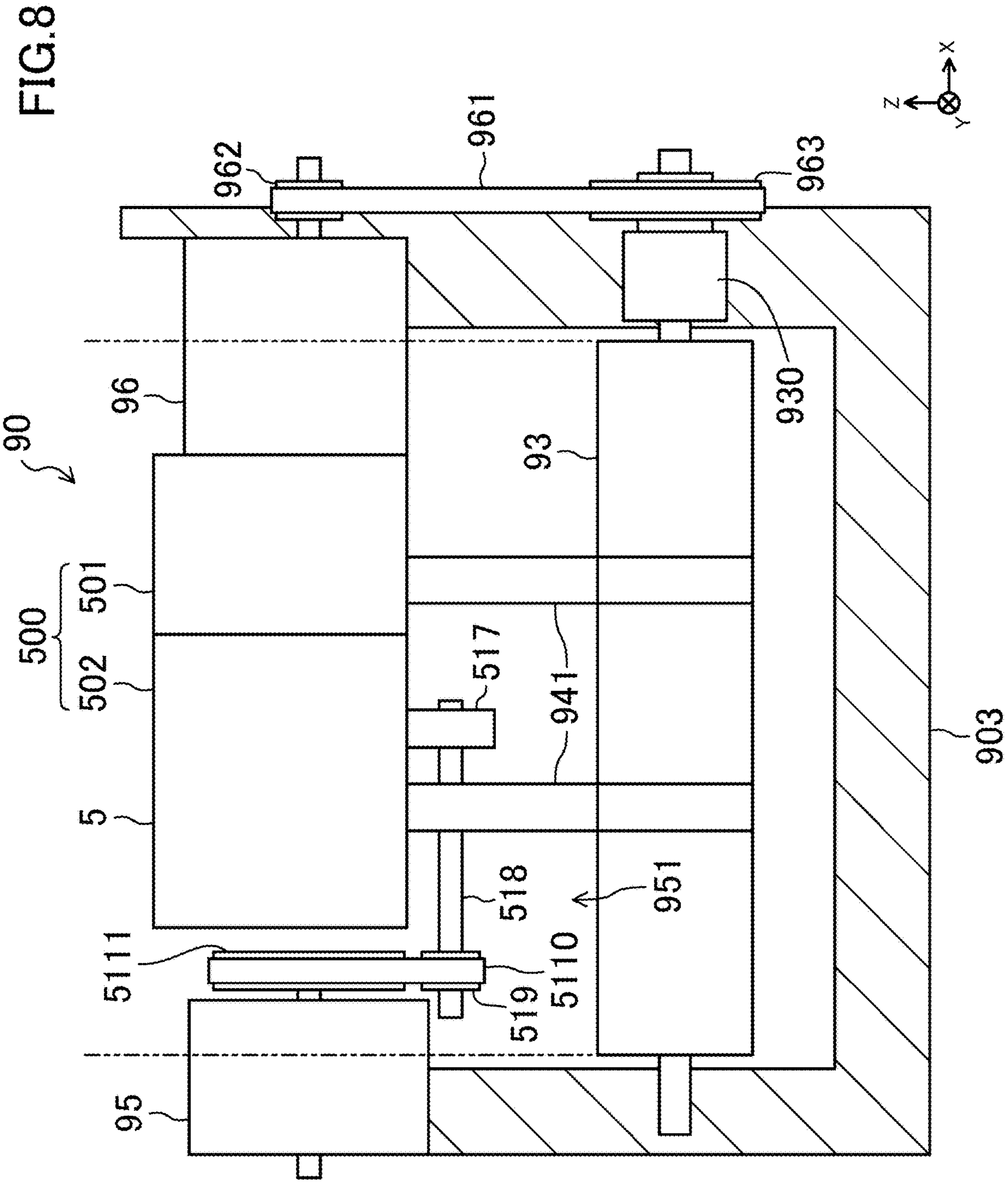
FIG. 8 is a sectional view of the banknote storage device.

As illustrated in FIG. 7, the cartridge 5 is attached to an upper portion of a front end of the body 903. The first reels 921 and the second reels 922 are, in the first region 901, positioned closer to the outlet/inlet 910 than the drum 93 is to. The cartridge 5 holds the first reels 921 and the second reels 922, and therefore, in the first region 901, the cartridge 5 is attached to a location closer to the outlet/inlet 910 than the drum 93 is to. As also illustrated in FIG. 8, the reel motor 95 and the drum motor 96 are arranged at the upper portion of the front end of the body 903. The reel motor 95 is a drive source configured to drive the two first reels 921 and the two second reels 922. The drum motor 96 is a drive source configured to drive the drum 93. The reel motor 95 is arranged at an end in the X-axis negative direction at the upper portion of the front end of the body 903. The drum motor 96 is arranged at an end in the X-axis positive direction at the upper portion of the front end of the body 903. The cartridge 5 is arranged between the reel motor 95 and the drum motor 96.

As illustrated in FIG. 8, the drum motor 96 and the drum 93 are coupled to each other through a first belt 961. The first belt 961 is arranged at the side of the body 903 in the X-axis positive direction. The first belt 961 is bridged between a motor pulley 962 attached to a shaft of the drum motor 96 and a drum pulley 963 attached to the shaft 930 of the drum 93. The shaft of the drum motor 96 protrudes from the body 903 to the outside in the X-axis positive direction. When the drum motor 96 is driven in a forward rotation direction or a reverse rotation direction, the drum 93 rotates forward or backward.

Figure 9:
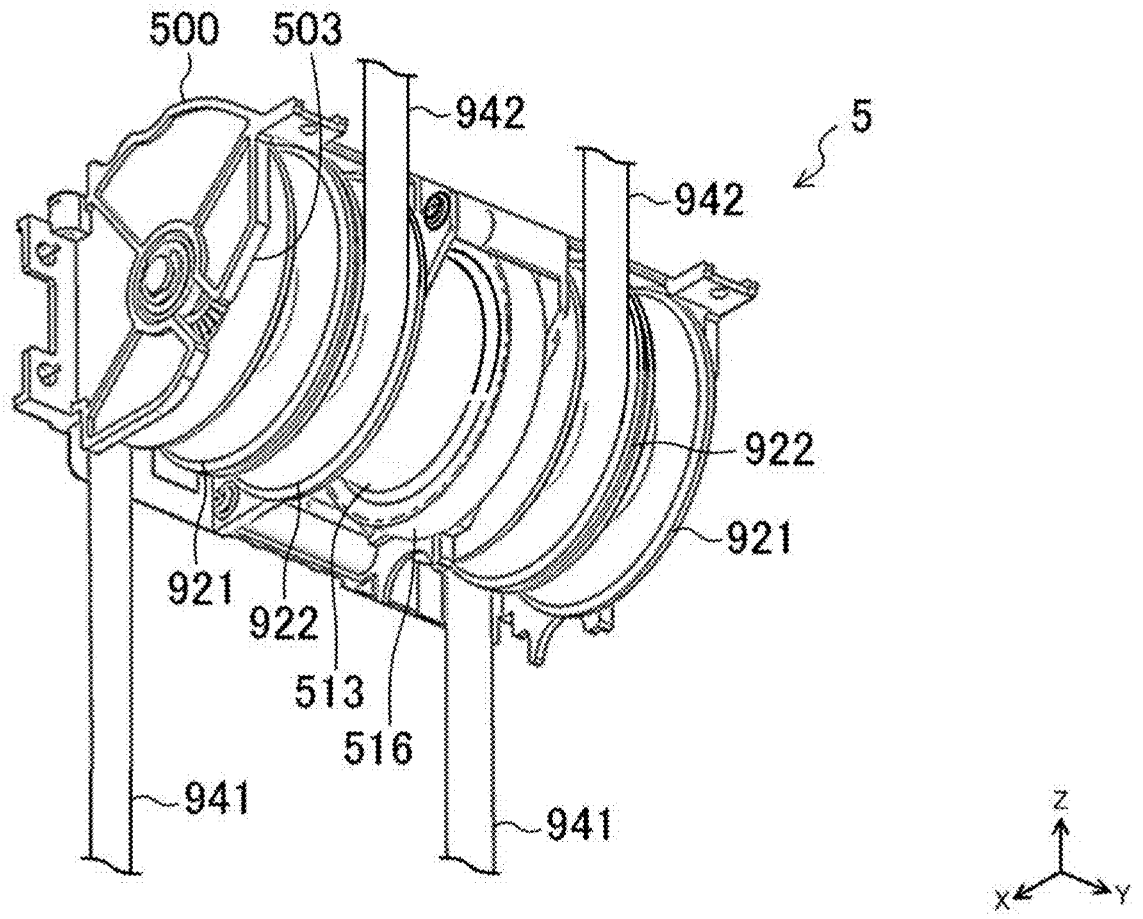
FIG. 9 is a perspective view illustrating a cartridge.
Figure 10:
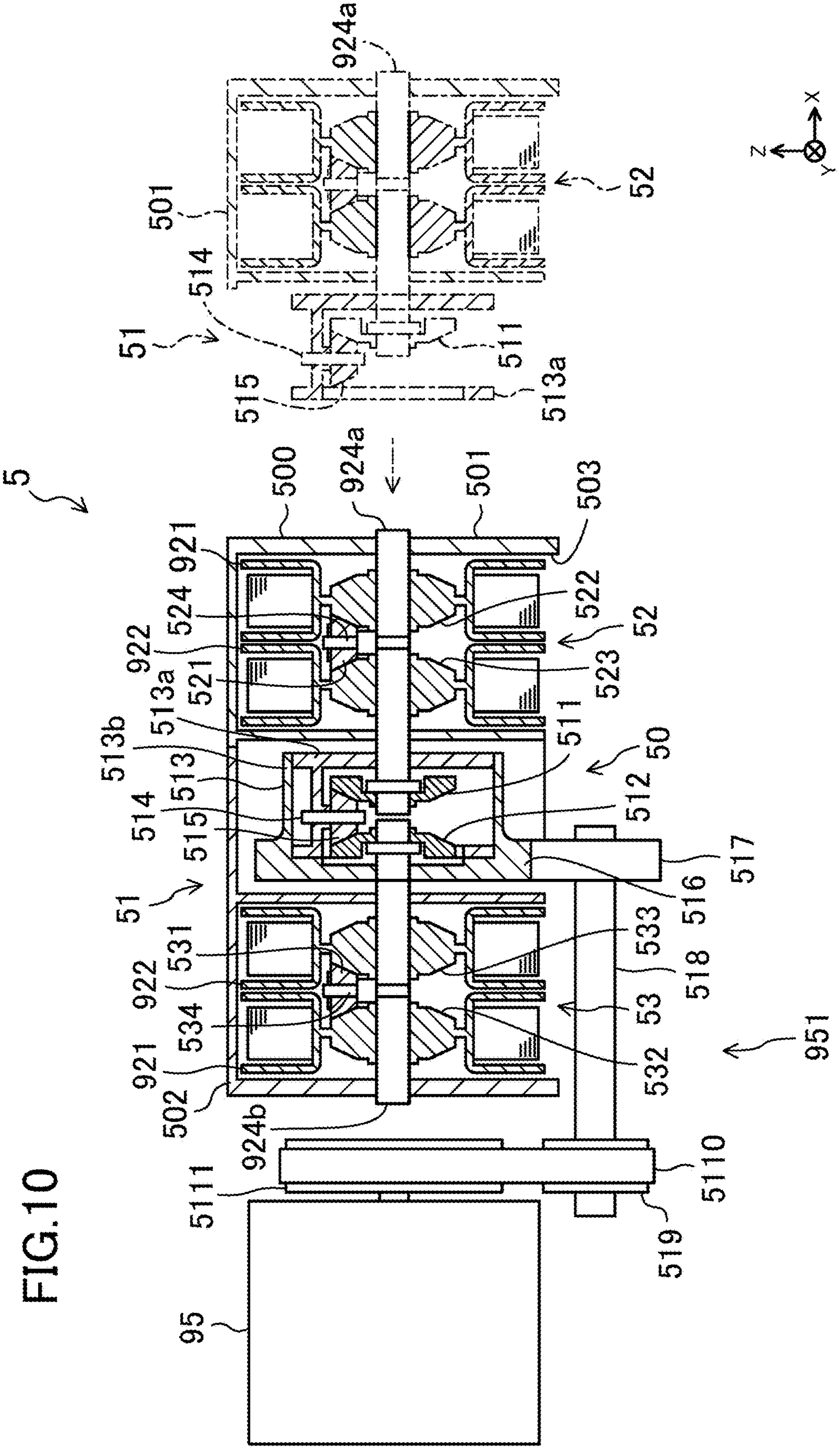
FIG. 10 is a sectional view illustrating a configuration of a distribution mechanism.

As illustrated as an example in FIGS. 9 and 10, the cartridge 5 has the two first reels 921, the two second reels 922, and a holder 500 configured to hold these reels 921, 922.

The holder 500 has an opening 503 through which the tapes 941, 942 drawn out of the reels 921, 922 pass. The opening 503 opens larger in the Y-axis positive direction and a Z-axis negative direction.

As described above, the two first reels 921 and the two second reels 922 are arranged on the same axis. The cartridge 5 is compact. The shaft 924 is divided into the first shaft **924*a* and the second shaft 924*b* arranged on the same axis. The first shaft 924*a* supports the single first reel 921 and the single second reel 922, and the second shaft 924*b* supports the single first reel 921 and the single second reel 922. Each of the first shaft 924*a* and the second shaft 924*b* is rotatably supported on the holder 500**.

The cartridge 5 has a distribution mechanism 50. The distribution mechanism 50 is a mechanism configured to distribute the drive force of the reel motor 95 to each of the four reels 921, 922. The reel motor 95 and the distribution mechanism 50 provide the drive force to each reel 921, 922 when the drum 93 rotates to wind up banknotes and the tapes 941, 942 and when the drum 93 rotates to feed out banknotes and the tapes 941, 942. With the drive force provided to each reel 921, 922, a predetermined tension is provided to each of the four tapes 941, 942. The banknote storage device 9 can stably wind up banknotes and the tapes 941, 942 around the drum 93, and can stably feed the wound banknotes and the wound tapes 941, 942 out of the drum 93.

The tapes 941, 942 described herein are arranged next to each other in the axial direction of the drum 93, and press each banknote at a plurality of locations. When the diameter of the drum 93 around which banknotes are wound together with the tapes 941, 942 is large, the diameter of the drum 93 might be non-uniform in the axial direction of the drum 93 in some cases. With the non-uniform diameter of the drum 93 in the axial direction, the speed of winding up the tapes 941, 942 or feeding out the tapes 941, 942 upon rotation of the drum 93 is different among the plurality of tapes 941, 942. For this reason, the tension generated at the tapes 941, 942 is non-uniform among the plurality of tapes 941, 942. With the non-uniform tension generated at the tapes 941, 942, displacement of banknotes wound around the drum 93 is caused.

The distribution mechanism 50 has the function of absorbing a speed difference among the plurality of tapes 941, 942 and constantly adjusting the tension of the plurality of tapes 941, 942 to the predetermined tension. Hereinafter, a configuration of the distribution mechanism 50 will be described with reference to FIG. 10.

The distribution mechanism 50 has a first differential mechanism 51, a second differential mechanism 52, and a third differential mechanism 53. Each of the first differential mechanism 51, the second differential mechanism 52, and the third differential mechanism 53 includes bevel gears.

The first differential mechanism 51 has a first side gear 511 fixed to the first shaft 924*a*, a second side gear 512 fixed to the second shaft 924*b*, and a pinion case 513.

The first side gear 511 is a bevel gear. The first side gear 511 is fixed to a base end of the first shaft 924*a*. The first side gear 511 rotates together with the first shaft 924*a*.

The second side gear 512 is a bevel gear. The second side gear 512 is fixed to a tip end of the second shaft 924*b*. The second side gear 512 rotates together with the second shaft 924*b*. The second side gear 512 faces the first side gear 511. The number of gear teeth is the same between the second side gear 512 and the first side gear 511.

The pinion case 513 is rotatably supported on the first shaft 924*a* and the second shaft 924*b*. The pinion case 513 is rotatable relative to the first shaft 924*a* and the second shaft 924*b*. A pin 514 is fixed to the pinion case 513. The pin 514 is arranged in a direction perpendicular to the first shaft 924*a* and the second shaft 924*b*. A pinion gear 515 is attached to the pin 514. The pinion gear 515 is arranged between the first side gear 511 and the second side gear 512. The pinion gear 515 engages with each of the first side gear 511 and the second side gear 512. The pinion gear 515 rotates about the pin 514. When the pinion case 513 rotates, the pinion gear 515 revolves about the first shaft 924*a* and the second shaft 924*b*.

A driven gear 516 is provided integrally with the pinion case 513. The driven gear 516 engages with a drive gear 517 through the opening 503 of the cartridge 5. The drive gear 517 is fixed to a tip end of a transmission shaft 518. A driven pulley 519 is fixed to a back end of the transmission shaft 518. As illustrated in FIG. 8, the transmission shaft 518 is arranged among the first and second reels 921, 922 and the drum 93. The transmission shaft 518 extends in the X-axis direction. The transmission shaft 518 is supported by the body 903.

A second belt 5110 is wound around the driven pulley 519. The second belt 5110 is wound around a drive pulley 5111 attached to the shaft of the reel motor 95. The drive force of the reel motor 95 is transmitted from the second belt 5110 to the drive gear 517 through the transmission shaft 518. The drive gear 517 inputs the drive force of the reel motor 95 to the driven gear 516. The drive force of the reel motor 95 is input to the pinion case 513.

The driven gear 516 is provided at a position on the opposite side of the first reel 921 and the second reel 922 from the reel motor 95. The drive gear 517, the transmission shaft 518, the driven pulley 519, the second belt 5110, and the drive pulley 5111 form a transmission mechanism 951. The transmission mechanism 951 is a mechanism provided at the body 903 and configured to transmit the drive force of the reel motor 95 to the driven gear 516. The transmission mechanism 951 transmits the drive force of the reel motor 95 to the driven gear 516 to bypass the first reels 921 and the second reels 922. The driven gear 516 is one example of a connection unit connected to the transmission mechanism 951 in a state in which the cartridge 5 is attached to the body 903.

The first differential mechanism 51 equally distributes the drive force of the reel motor 95 input to the pinion case 513 to the first shaft 924*a* and the second shaft 924*b*. Moreover, the first differential mechanism 51 absorbs a speed difference between the first shaft 924*a* and the second shaft 924*b*.

The second differential mechanism 52 is provided at the first shaft 924*a*. The second differential mechanism 52 is provided between the first reel 921 and the second reel 922 on a side in the X-axis positive direction. The second differential mechanism 52 has a first pinion gear 521, a first side gear 522, and a second side gear 523. The first pinion gear 521 is rotatably supported by a pin 524 fixed perpendicularly to the first shaft 924*a*. The first pinion gear 521 rotates and revolves. The first side gear 522 is formed at the first reel 921. The second side gear 523 is formed at the second reel 922. The first side gear 522 and the second side gear 523 engage with the first pinion gear 521. The number of gear teeth is the same between the first side gear 522 and the second side gear 523.

The second differential mechanism 52 equally distributes the drive force input to the first shaft 924*a* to the first reel 921 and the second reel 922 through the first pinion gear 521, the first side gear 522, and the second side gear 523. The drive force input to the first shaft 924*a* is ½ T of the drive force T of the reel motor 95, and therefore, the second differential mechanism 52 transmits ¼ (=½×½) T of the drive force T of the reel motor 95 to each of the first reel 921 and the second reel 922.

The third differential mechanism 53 is provided at the second shaft 924*b*. A configuration of the third differential mechanism 53 is substantially the same as a configuration of the second differential mechanism 52. The third differential mechanism 53 is provided between the first reel 921 and the second reel 922 on a side in the X-axis negative direction. The third differential mechanism 53 has a second pinion gear 531, a third side gear 532, and a fourth side gear 533. The second pinion gear 531 is rotatably supported by a pin 534 fixed perpendicularly to the second shaft 924*b*. The second pinion gear 531 rotates and revolves. The third side gear 532 is formed at the first reel 921. The fourth side gear 533 is formed at the second reel 922.

The third differential mechanism 53 equally distributes the drive force input to the second shaft 924*b* to the first reel 921 and the second reel 922 through the second pinion gear 531, the third side gear 532, and the fourth side gear 533. The drive force input to the second shaft 924*b* is ½ T of the drive force T of the reel motor 95, and therefore, the third differential mechanism 53 transmits ¼ (=½×½) T of the drive force T of the reel motor 95 to each of the first reel 921 and the second reel 922.

When the speeds of the four tapes 941, 942 are non-uniform, each of the first differential mechanism 51, the second differential mechanism 52, and the third differential mechanism 53 can absorb the speed difference by rotation of the pinion gears 515, 521, 531. Optimal drive force is provided to each of the two first reels 921 and the two second reels 922. As a result, even when the diameter of the drum 93 is non-uniform in the axial direction, the tension generated at the four tapes 941, 942 is uniform or substantially uniform on a constant basis.

The tension generated at the four tapes 941, 942 is uniform or substantially uniform, and therefore, displacement of banknotes wound around the drum 93 can be prevented. As a result, occurrence of jam of banknotes in the banknote storage device 9 can be reduced. When jam is caused in the banknote storage device 9, such jam is eliminated by cutting of the tapes in many cases. When the tapes are cut, the maintenance person needs to replace the cartridge of the banknote storage device 9. Reduction in jam of banknotes in the banknote storage device 9 by the distribution mechanism 50 is advantageous in cost reduction.

The speed difference among the four tapes 941, 942 is automatically absorbed by the first differential mechanism 51, the second differential mechanism 52, and the third differential mechanism 53 configured mechanically, and therefore, the distribution mechanism 50 can optimally adjust the drive force provided to the four reels 921, 922 only by control of the reel motor 95 and the drum motor 96. With the distribution mechanism 50 having the above-described configuration, a control system configuration can be simplified.

(Divided Configuration of Holder)

The holder 500 of the cartridge 5 can be divided into two portions as indicated by a chain line in FIG. 10. The holder 500 has a first holder 501 and a second holder 502.

The first holder 501 holds the first shaft 924*a*, the second differential mechanism 52, and part of the first differential mechanism 51. Part of the first differential mechanism 51 specifically includes the first side gear 511, the pin 514, and the pinion gear 515. Moreover, the pinion case 513 can be also divided into a first case 513*a* and a second case 513*b*. The pin 514 is fixed to the first case 513*a*. The driven gear 516 is formed at the second case 513*b*. The first holder 501 holds the first case 513*a* through the first shaft 924*a*.

The second holder 502 holds the second shaft 924*b*, the third differential mechanism 53, and part of the first differential mechanism 51. Part of the first differential mechanism 51 specifically includes the second side gear 512 and the second case 513*b*.

The holder 500 has a divided configuration, and therefore, manufacturing of the cartridge 5 with a complicated configuration is facilitated. In a case where only part of the cartridge 5 is damaged, only such part may be replaced. For example, in a case where only the tapes on the reels held by the first holder 501 are damaged, it is only required that only the first holder 501 and the mechanism held by the first holder 501 are replaced, and there is no need to replace the second holder 502 and the mechanism held by the second holder 502.

(Steps of Replacing Cartridge)

In the banknote storage device 9, in a case where, e.g., the tapes 941, 942 are cut, the tapes 941, 942 and the reels 921, 922 need to be replaced. The banknote storage device 9 is configured such that the maintenance person replaces the cartridge 5 to complete replacement of the tapes 941, 942 and the reels 921, 922.

In the case of replacing the cartridge 5, the maintenance person first opens the door at the front portion or the back portion of the safe housing 131, thereby drawing the first to tenth storage devices 31 to 310 out of the safe housing 131. Moreover, the maintenance person takes the banknote storage device 9 targeted for replacement out of the banknote handling device 1.

After the banknote storage device 9 has been taken out of the banknote handling device 1, the maintenance person takes the transport module 71, 72 of the banknote storage device 9 out of the housing module 90. Moreover, the maintenance person opens the transport path 920 of the housing module 90 such that the inside of the housing module 90 is exposed. Then, the maintenance person detaches the tip ends of the tapes 941, 942 from the drum 93. As illustrated as an example in FIG. 11, an engagement piece 944 is attached to the tip end of the tape 941, 942. A long hole 945 is provided at the engagement piece 944. A U-shaped groove opens at an outer peripheral surface of a core 933 of the drum 93. This groove forms an engagement portion 934 at the core 933. The engagement portion 934 has such a width that the engagement portion 934 can be inserted into the long hole 945.

Figure 11:
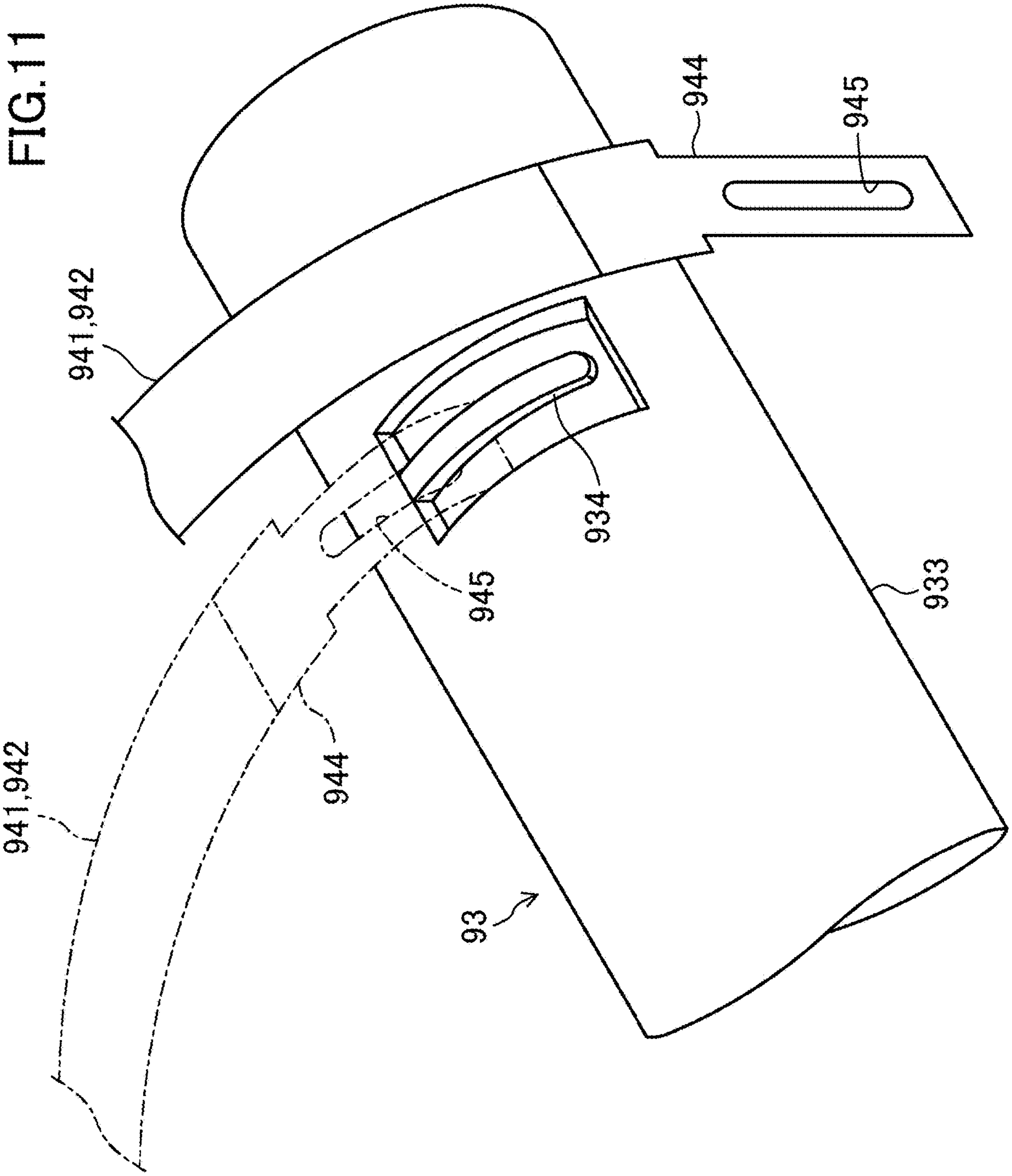
FIG. 11 is a perspective view illustrating an engagement portion of a drum.

As indicated by a chain line in FIG. 11, the maintenance person engages the engagement piece 944 with the engagement portion 934. In this manner, the maintenance person can attach the tip end portion of the tape 941, 942 to the drum 93. The maintenance person detaches the engagement piece 944 from the engagement portion 934, and in this manner, can detach the tip end portion of the tape 941, 942 from the drum 93. The maintenance person can easily engage the tip end portion of the tape 941, 942 with the drum 93 or detach the tip end portion of the tape 941, 942 from the drum 93. Since the engagement portion 934 merely engages with the long hole 945 of the engagement piece 944, the angle of the tape with respect to a circumferential direction of the drum is not fixed. With this configuration, twisting of the vicinity of the engagement piece 944 upon winding of the tape 941, 942 around the drum can be prevented.

After the tip end portion of the tape 941, 942 has been detached from the drum 93, the maintenance person takes the cartridge 5 out of the body 903 of the housing module 90. The holder 500 of the cartridge 5 holds all of the four reels 921, 922, and therefore, the maintenance person can take all of the four reels 921, 922 out of the body 903 only by taking one cartridge 5 out of the body 903 of the housing module 90. Moreover, the holder 500 can hold each reel 921, 922 in a state in which all of the tapes 941, 942 are wound up across the entire lengths thereof. Thus, the cartridge 5 can hold the reels 921, 922 around which the tapes 941, 942 are wound across the entire lengths thereof. The cartridge 5 is taken out of the body 903 so that the maintenance person can take the entire length of each tape 941, 942 out of the body 903.

After the old cartridge 5 has been detached, the maintenance person attaches the new cartridge 5 to the body 903. One cartridge 5 is attached to the body 903 so that the maintenance person can attach the four reels 921, 922 to the body 903.

At this point, the maintenance person needs to arrange each of the four tapes 941, 942 of the new cartridge 5 along the tape paths 810, 820. However, as illustrated in FIG. 4, the tape paths 810, 820 are complicated. Moreover, the thicknesses of the tapes 941, 942 are extremely thin, and the tapes 941, 942 have almost no elasticity against bending. For this reason, it is difficult for the maintenance person to arrange the tapes 941, 942 along the tape paths 810, 820.

Figure 12:
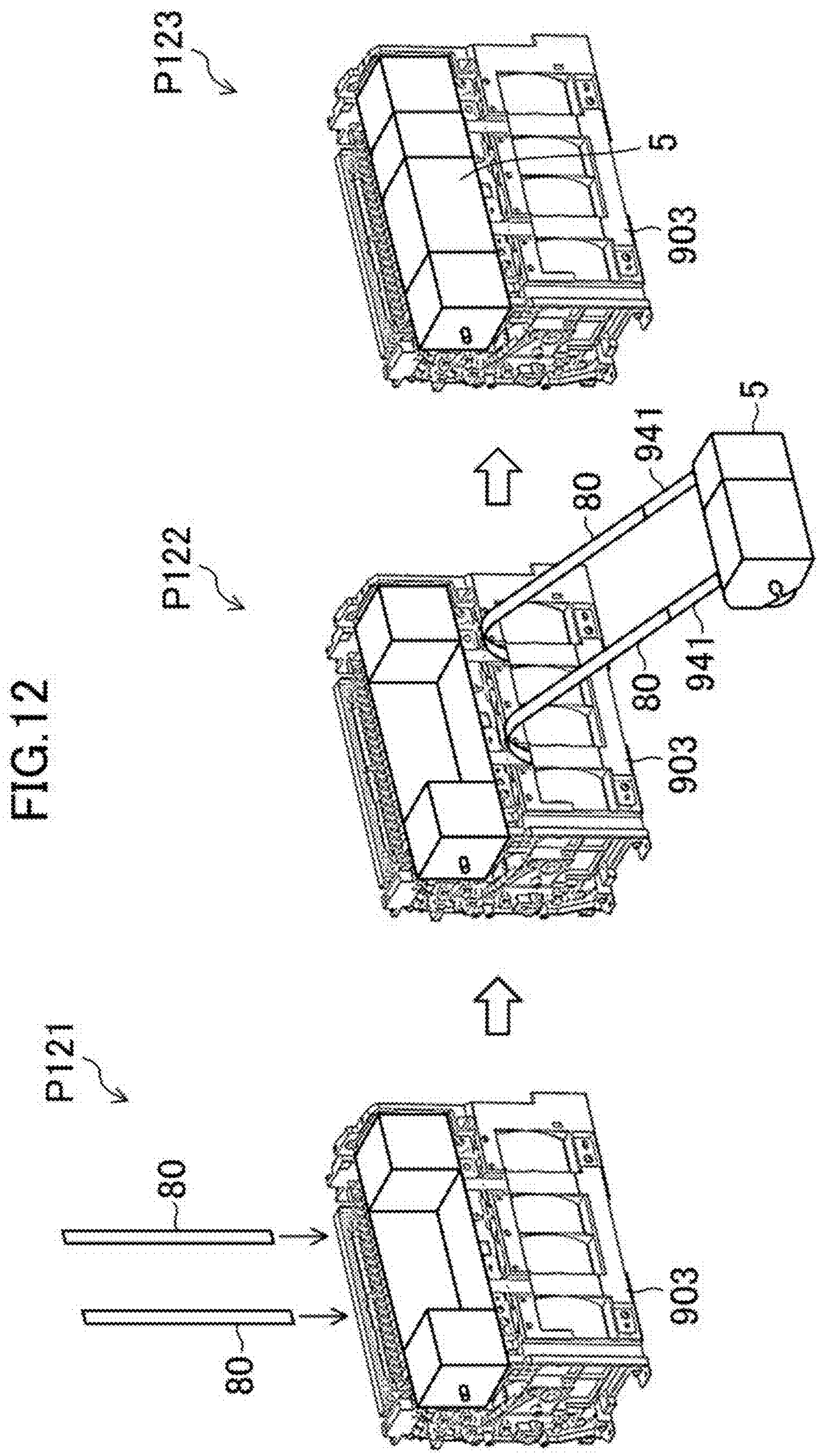
FIG. 12 is a view illustrating steps when tapes are arranged on tape paths.

Thus, the maintenance person may arrange the tapes 941, 942 on the tape paths 810, 820 by means of aids 80 illustrated as an example in FIG. 12. The aid 80 is an elongated plate-shaped member. The aid 80 is made of a material having more elasticity against bending than that of the tape 941, 942. The maintenance person first inserts the aids 80 from a drum 93 side to a reel 921, 922 side along the tape paths 810, 820 (step P121 of FIG. 12). Since the aids 80 have elasticity, the maintenance person can relatively easily insert the aids 80 along the tape paths 810, 820.

Subsequently, the maintenance person fixes the tip ends of the tapes 941, 942 to tip ends of the aids 80 (step P122, and note that the first tapes 941 in the example of FIG. 12). For example, the tip ends of the aids 80 and the tip ends of the tapes 941, 942 may be connected to each other by means of a not-shown adhesive tape.

After the tip ends of the aids 80 and the tip ends of the tapes 941, 942 have been connected to each other, the maintenance person pulls the aids 80 back from the drum 93 side. In this manner, the tapes 941, 942 pass, together with the aids 80, through the tape paths 810, 820. When the tip ends of the tapes 941, 942 reach the position of the drum 93, the tapes 941, 942 are arranged along the tape paths 810, 820.

Thereafter, the maintenance person engages the engagement pieces 944 of the tip ends of the tapes 941, 942 with the engagement portions 934 of the drum 93. Moreover, the new cartridge 5 is attached to the body 903 (step P123). Using the aids 80, the maintenance person can easily arrange the tapes 941, 942 along the tape paths 810, 820.

Figure 13:
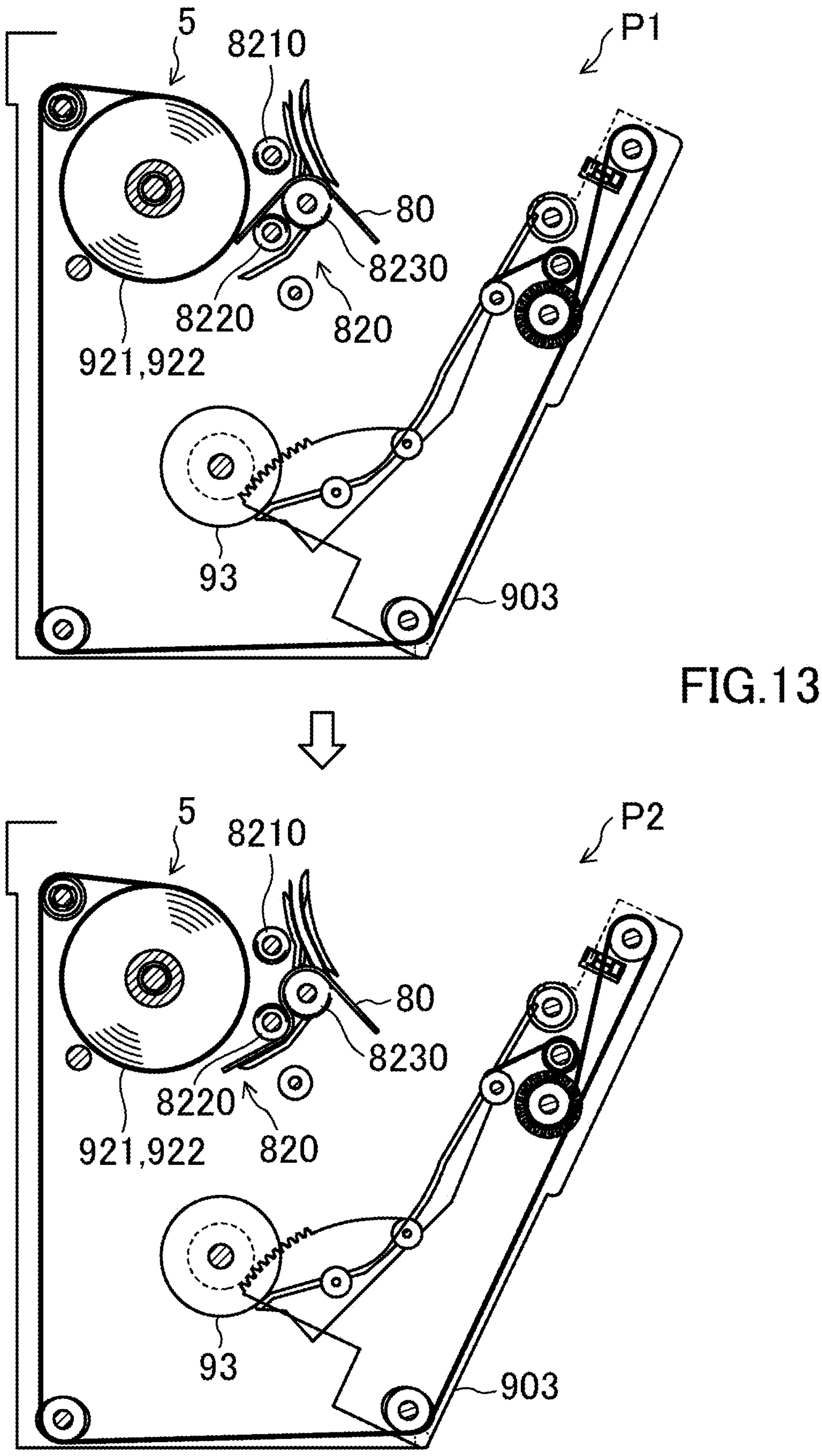
FIG. 13 is a view illustrating some of the steps when the tapes are arranged on the tape paths.
Figure 14:
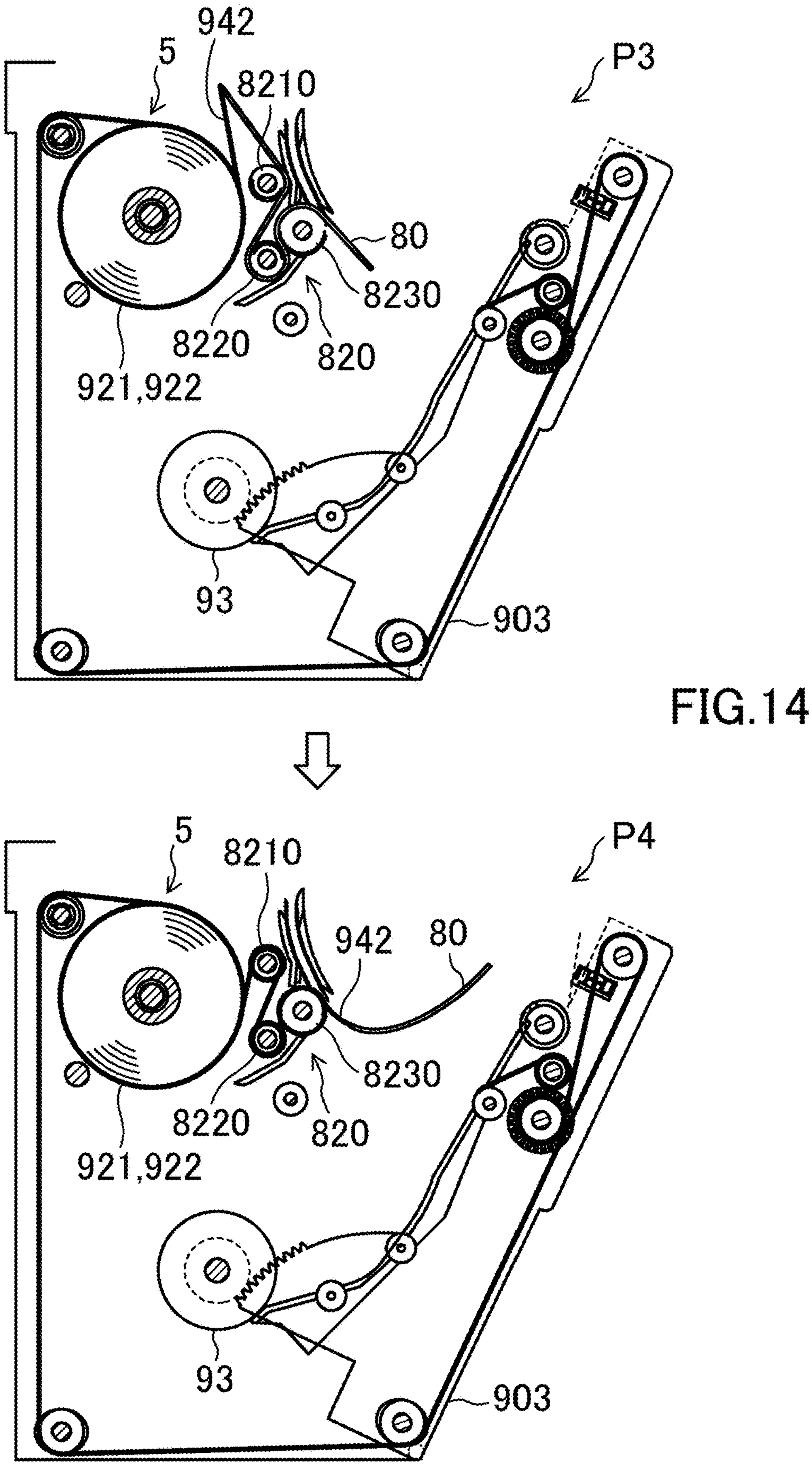
FIG. 14 is a view illustrating some of the steps when the tapes are arranged on the tape paths.
Figure 15:
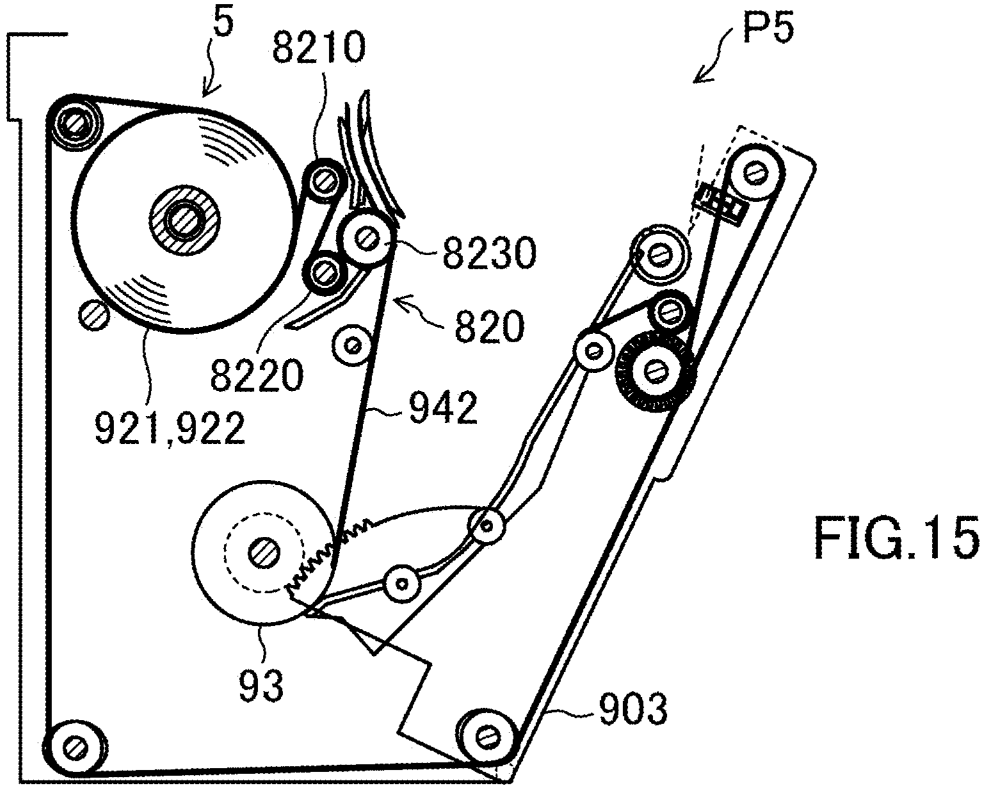
FIG. 15 is a view illustrating some of the steps when the tapes are arranged on the tape paths.

The above-described steps will be described in more detail with reference to the figures. FIGS. 13 to 15 illustrate the steps of arranging the second tapes 942 along the second tape path 820. In FIGS. 13 to 15, the cartridge 5 is attached to the body 903. Note that the cartridge 5 may be attached to the body 903 before the tapes 941, 942 are arranged along the tape paths 810, 820, or may be attached to the body 903 after the tapes 941, 942 have been arranged along the tape paths 810, 820.

First, the maintenance person inserts, as described above, the aids 80 from the drum 93 side to the reel 921, 922 side along the tape path 820. At step P1 in FIG. 13, the maintenance person winds the aids 80 around the tenth tape pulleys 8230. At step P2 in FIG. 13, the maintenance person winds the aids 80 around the ninth tape pulleys 8220. At step P3 in FIG. 14, the maintenance person winds the aids 80 around the eighth tape pulleys 8210. The tip ends of the aids 80 reach the vicinity of the second reels 922.

The maintenance person connects the tip ends of the aids 80 to the tip ends of the second tapes 942 drawn out of the second reels 922. Thereafter, the maintenance person pulls base ends of the aids 80. In this manner, the second tapes 942 are wound around the eighth tape pulleys 8210, the ninth tape pulleys 8220, and the tenth tape pulleys 8230 in this order (see step P4 in FIG. 14). The tapes are arranged along the second tape path 820.

As illustrated at step P5 in FIG. 15, the maintenance person engages the tip end portions of the second tapes 942 with the engagement portions 934 of the drum 93.

Using the aids 80, the maintenance person can easily arrange, in the banknote storage device 9, the tapes 941, 942 along the tape paths 810, 820, and can promptly complete replacement of the tapes 941, 942 and the reels 921, 922.

(Another Configuration Example of Distribution Mechanism)

Figure 16:
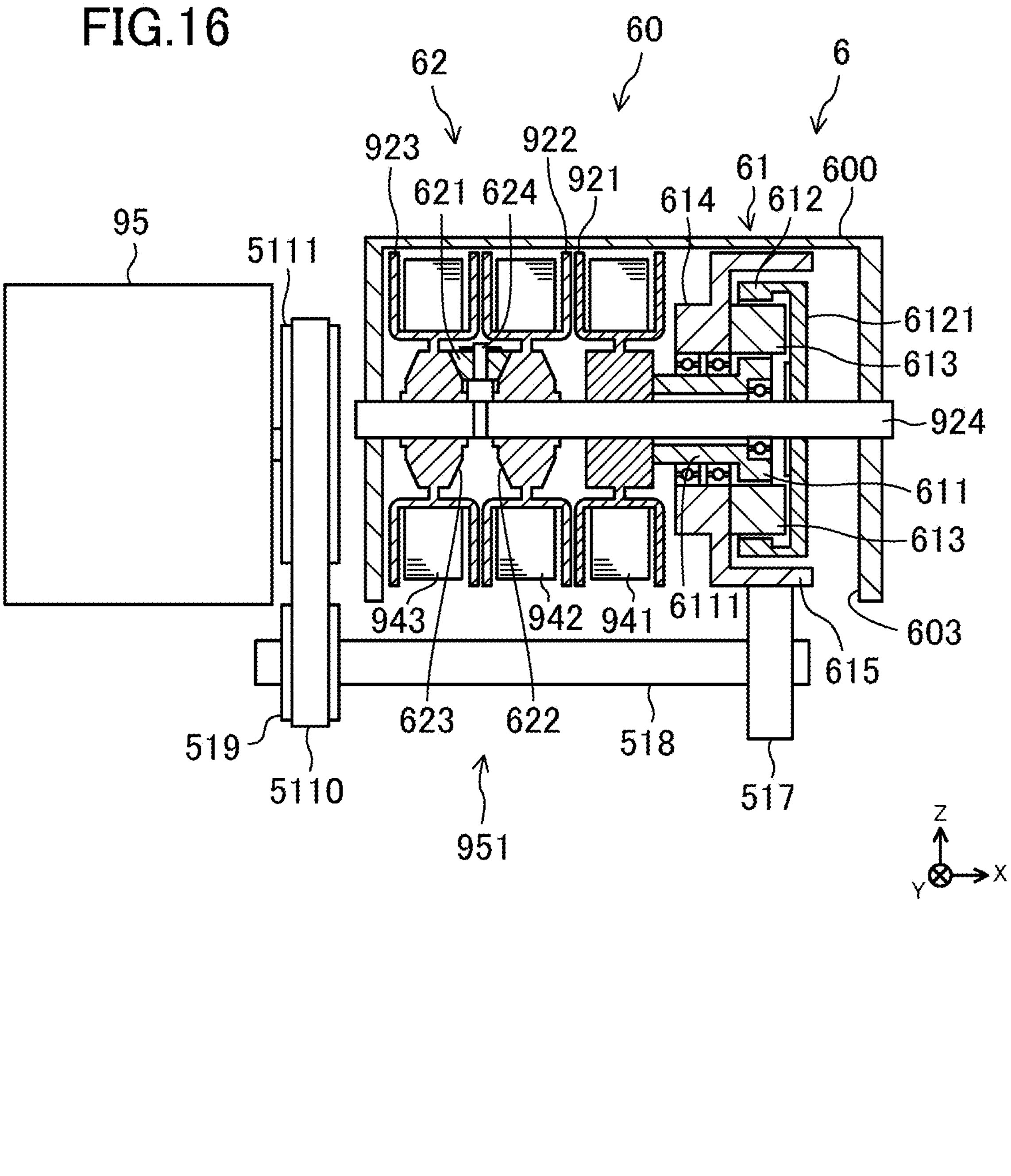
FIG. 16 is a sectional view of a distribution mechanism having a configuration different from that of FIG. 10.

FIG. 16 illustrates another configuration example of the distribution mechanism included in the cartridge. This cartridge 6 has three tapes including the first tape 941, the second tape 942, and a third tape 943. Thus, the cartridge 6 has three reels including the first reel 921, the second reel 922, and a third reel 923. The first reel 921, the second reel 922, and the third reel 923 are arranged on the same axis.

A holder 600 holds the first reel 921, the second reel 922, and the third reel 923. The holder 600 has an opening 603. The first tape 941, the second tape 942, and the third tape 943 are drawn out of the holder 600 through the opening 603. Since the first reel 921, the second reel 922, and the third reel 923 are on the same axis, the cartridge 6 is compact.

The cartridge 6 has a distribution mechanism 60. The distribution mechanism 60 distributes the drive force of the reel motor 95 to the first reel 921, the second reel 922, and the third reel 923. The distribution mechanism 60 has a first differential mechanism 61 and a second differential mechanism 62. The first differential mechanism 61 includes planetary gears. The second differential mechanism 62 includes bevel gears.

The first differential mechanism 61 is arranged at one end portion (the right end portion as viewed in the plane of paper of FIG. 16) of the shaft 924 for the reels. The first differential mechanism 61 has a sun gear 611, a ring gear 612, planetary gears 613, and a carrier 614.

The sun gear 611 is fitted onto the shaft 924. The sun gear 611 is supported by the shaft 924 through a bearing. Teeth are formed at an outer peripheral surface of the sun gear 611. A pipe 6111 fitted onto the shaft 924 and extending along the shaft 924 is provided integrally with the sun gear 611. A tip end of the pipe 6111 is fixed to a side surface of the first reel 921. The sun gear 611 and the first reel 921 rotate integrally. The sun gear 611 and the first reel 921 rotate relative to the shaft 924.

The ring gear 612 is provided to surround the outer periphery of the sun gear 611. Teeth are formed at an inner peripheral surface of the ring gear 612. The ring gear 612 is fixed to the shaft 924. More specifically, a discoid coupling member 6121 radially expanding about the shaft 924 is provided integrally with the ring gear 612. The coupling member 6121 is fixed to the shaft 924. The ring gear 612 and the shaft 924 rotate integrally.

The planetary gears 613 are arranged between the sun gear 611 and the ring gear 612. In this configuration example, the plurality of planetary gears 613 is arranged at equal intervals in the circumferential direction. Teeth are formed at an outer peripheral surface of the planetary gear 613. The planetary gears 613 each engage with the sun gear 611 and the ring gear 612.

The carrier 614 rotatably supports each planetary gear 613. Moreover, the carrier 614 is supported by the pipe 6111 of the sun gear 611 through a bearing. The carrier 614 rotates about the shaft 924 relative to the shaft 924, the sun gear 611, and the ring gear 612. The planetary gears 613 supported by the carrier 614 rotate, and revolves about the shaft 924.

A driven gear 615 is attached integrally with the carrier 614. The driven gear 615 is formed in a cylindrical shape to surround the planetary gears. The drive gear 517 engages with the driven gear 615. As described above, the drive gear 517 forms the transmission mechanism 951 configured to transmit the drive force of the reel motor 95 to the driven gear 615.

The first differential mechanism 61 transmits the drive force input to the carrier 614 through the driven gear 615 to the first reel 921 through the sun gear 611, and transmits the drive force to the shaft 924 through the ring gear 612. The first differential mechanism 61 distributes the drive force input from the drive source to a first path and a second path. The first path is a path for transmitting the drive force to the first reel 921 through the sun gear 611. The second path is a path for transmitting the drive force to the shaft 924 (and the second reel 922 and the third reel 923 supported by the shaft 924) through the ring gear 612.

In the first differential mechanism 61, a gear ratio (i.e., the number of teeth of the sun gear 611/the number of teeth of the ring gear 612) between the sun gear 611 and the ring gear 612 is set to $\frac{1}{2}$. As one example, the number of teeth of the sun gear 611 may be 30, the number of teeth of the ring gear 612 may be 60, the number of teeth of the planetary gear 613 may be 15. With a gear ratio of $\frac{1}{2}$, the first differential mechanism 61 can transmit $\frac{1}{3}$ $(=1/(1+2))$ T of the drive force T input to the carrier 614 to the first reel 921, and can transmit $\frac{2}{3}$ $(=2/(1+2))$ T to the shaft 924.

The second differential mechanism 62 is provided between the second reel 922 and the third reel 923. The second differential mechanism 62 has a pinion gear 621 and two side gears including a first side gear 622 and a second side gear 623. The second differential mechanism 62 has the same configuration as that of the second differential mechanism 52 described above.

A pin 624 is attached to the shaft 924. The pinion gear 621 is rotatably supported by the pin 624. The pinion gear 621 rotates about the pin 624, and revolves about the shaft 924 upon rotation of the shaft 924.

The first side gear 622 is formed at the second reel 922. The first side gear 622 is a bevel gear about the shaft 924. The first side gear 622 engages with the pinion gear 621.

The second side gear 623 is formed at the third reel 923. The second side gear 623 is a bevel gear about the shaft 924. The second side gear 623 engages with the pinion gear 621. The number of teeth is the same between the first side gear 622 and the second side gear 623.

The second differential mechanism 62 equally distributes the drive force input to the shaft 924 to the second reel 922 and the third reel 923 through the pinion gear 621, the first side gear 622, and the second side gear 623.

As described above, the drive force input to the shaft 924 is ⅔ T of the drive force T of the reel motor 95, and therefore, the second differential mechanism 62 transmits ⅓ (=⅔×½) T of the drive force T of the reel motor 95 to the second reel 922, and transmits ⅓ (=⅔×½) T of the drive force T of the reel motor 95 to the third reel 923. Thus, the first differential mechanism 61 and the second differential mechanism 62 cooperate with each other to equally distribute the drive force of the reel motor 95 to the first reel 921, the second reel 922, and the third reel 923.

As described above, when the diameter of the drum 93 is non-uniform and there is a speed difference among the first tape 941, the second tape 942, and the third tape 943, each of the first differential mechanism 61 and the second differential mechanism 62 performs differential operation to absorb the speed difference. When the speeds of the three tapes 941, 942, 943 are non-uniform or tend to be non-uniform, each of the first differential mechanism 61 and the second differential mechanism 62 performs the differential operation to absorb such a speed difference. Tension generated at the three tapes 941, 942, 943 is uniform or substantially uniform on a constant basis.

Note that the number of reels included in the cartridge may be two, for example.

Note that the configuration of the banknote storage device to which the technique disclosed herein is applicable is not limited to the above-described configuration. The technique disclosed herein is applicable to sheet storage devices with various configurations. For example, the technique disclosed herein is applicable to the temporary storage unit 24 or the compact storage device 311.

Figure 17:
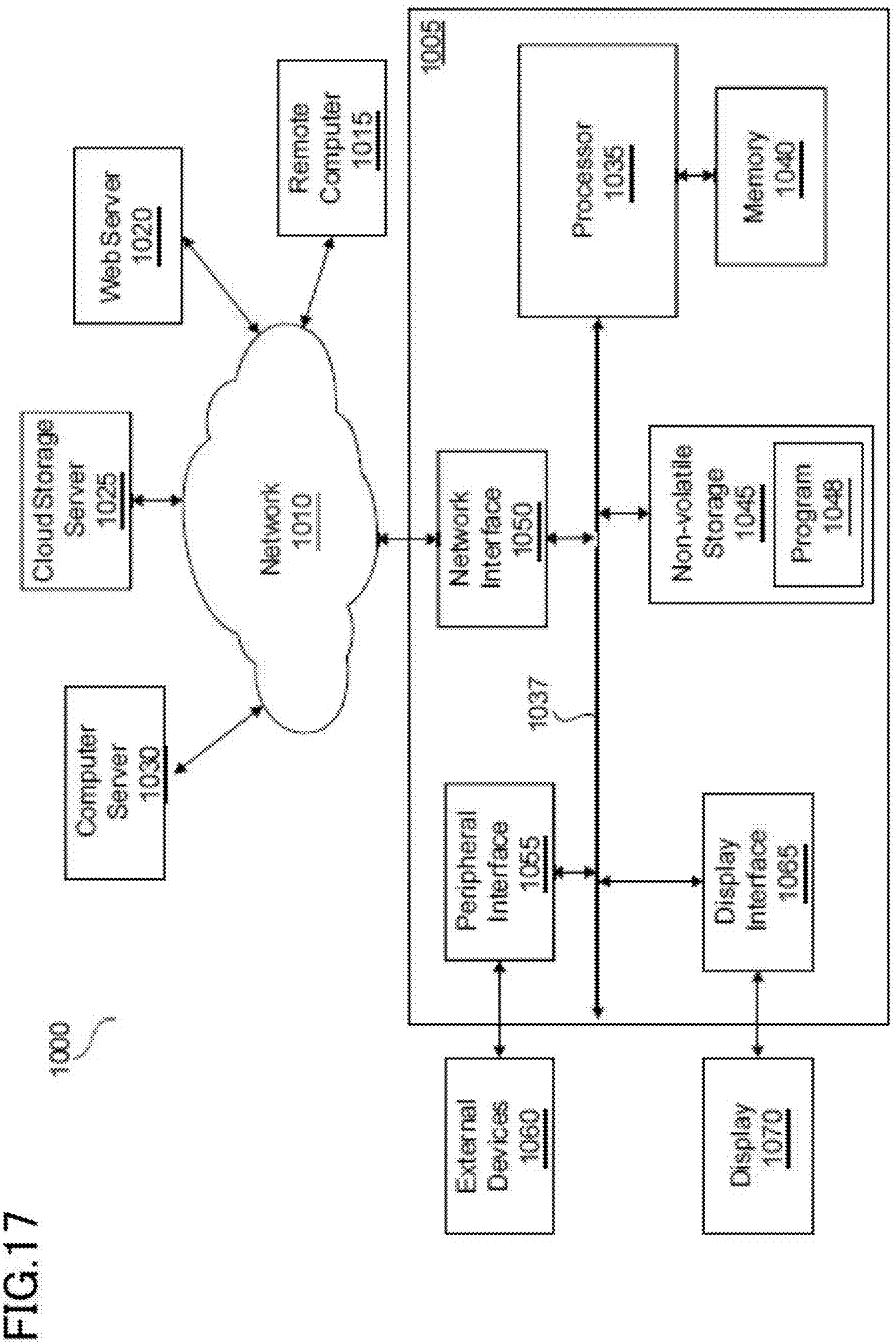
FIG. 17 is a block diagram of computer-based circuitry that may be used to implement control features of the present disclosure.

FIG. 17 illustrates a block diagram of a computer that may implement the various embodiments described herein. The present disclosure may be embodied as a system, a method, and/or a computer program product. The computer program product may include a non-transitory computer readable storage medium on which computer readable program instructions are recorded that may cause one or more processors to carry out aspects of the embodiment. For example, the controller 15, terminal 29, mobile terminal 202, network 280, management device 201 and their individual components as well as attached components may be configured to include various elements depicted in FIG. 17.

The non-transitory computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or compute server, or any combination of these computing devices. The remote computer or compute server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 17 is a functional block diagram illustrating a networked system 1000 of one or more networked computers and servers. In an embodiment, the hardware and software environment illustrated in FIG. 17 may provide an exemplary platform for implementation of the software and/or methods according to the present disclosure.

Referring to FIG. 17, a networked system 1000 may include, but is not limited to, computer 1005, network 1010, remote computer 1015, web server 1020, cloud storage server 1025 and compute server 1030. In some embodiments, multiple instances of one or more of the functional blocks illustrated in FIG. 17 may be employed.

Additional detail of computer 1005 is shown in FIG. 17. The functional blocks illustrated within computer 1005 are provided only to establish exemplary functionality and are not intended to be exhaustive. And while details are not provided for remote computer 1015, web server 1020, cloud storage server 1025 and compute server 1030, these other computers and devices may include similar functionality to that shown for computer 1005.

Computer 1005 may be a personal computer (PC), a desktop computer, laptop computer, tablet computer, netbook computer, a personal digital assistant (PDA), a smart phone, or any other programmable electronic device capable of communicating with other devices on network 1010.

Computer 1005 may include processor 1035, bus 1037, memory 1040, non-volatile storage 1045, network interface 1050, peripheral interface 1055 and display interface 1065. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 1035 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 1037 may be a proprietary or industry standard high-speed parallel or serial peripheral interconnect bus, such as ISA, PCI, PCI Express (PCI-e), AGP, and the like.

Memory 1040 and non-volatile storage 1045 may be computer-readable storage media. Memory 1040 may include any suitable volatile storage devices such as Dynamic Random Access Memory (DRAM) and Static Random Access Memory (SRAM). Non-volatile storage 1045 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 1048 may be a collection of machine readable instructions and/or data that is stored in non-volatile storage 1045 and is used to create, manage and control certain software functions that are discussed in detail elsewhere in the present disclosure and illustrated in the drawings. In some embodiments, memory 1040 may be considerably faster than non-volatile storage 1045. In such embodiments, program 1048 may be transferred from non-volatile storage 1045 to memory 1040 prior to execution by processor 1035.

Computer 1005 may be capable of communicating and interacting with other computers via network 1010 through network interface 1050. Network 1010 may be, for example, a local area network (LAN), a wide area network (WAN) such as the Internet, or a combination of the two, and may include wired, wireless, or fiber optic connections. In general, network 1010 can be any combination of connections and protocols that support communications between two or more computers and related devices.

Peripheral interface 1055 may allow for input and output of data with other devices that may be connected locally with computer 1005. For example, peripheral interface 1055 may provide a connection to external devices 1060. External devices 1060 may include devices such as a keyboard, a mouse, a keypad, a touch screen, and/or other suitable input devices. External devices 1060 may also include portable computer-readable storage media such as, for example, thumb drives, portable optical or magnetic disks, and memory cards. Software and data used to practice embodiments of the present disclosure, for example, program 1048, may be stored on such portable computer-readable storage media. In such embodiments, software may be loaded onto non-volatile storage 1045 or, alternatively, directly into memory 1040 via peripheral interface 1055. Peripheral interface 1055 may use an industry standard connection, such as RS-232 or Universal Serial Bus (USB), to connect with external devices 1060.

Display interface 1065 may connect computer 1005 to display 1070. Display 1070 may be used, in some embodiments, to present a command line or graphical user interface to a user of computer 1005. Display interface 1065 may connect to display 1070 using one or more proprietary or industry standard connections, such as VGA, DVI, DisplayPort and HDMI.

As described above, network interface 1050, provides for communications with other computing and storage systems or devices external to computer 1005. Software programs and data discussed herein may be downloaded from, for example, remote computer 1015, web server 1020, cloud storage server 1025 and compute server 1030 to non-volatile storage 1045 through network interface 1050 and network 1010. Furthermore, the systems and methods described in this disclosure may be executed by one or more computers connected to computer 1005 through network interface 1050 and network 1010. For example, in some embodiments the systems and methods described in this disclosure may be executed by remote computer 1015, computer server 1030, or a combination of the interconnected computers on network 1010.

Data, datasets and/or databases employed in embodiments of the systems and methods described in this disclosure may be stored and or downloaded from remote computer 1015, web server 1020, cloud storage server 1025 and compute server 1030.

What is claimed is:

1. A sheet storage device, comprising:
a cartridge having a plurality of tape reels and a holder to hold the plurality of tape reels; and
a body having a drum to wind, together with a plurality of tapes drawn out of the plurality of tape reels, a sheet around the drum to house the sheet, wherein
the cartridge is detachably attached to the body,
the body has a drive source and a transmission mechanism to transmit a drive force from the drive source,
the cartridge is connected to the transmission mechanism when the cartridge is attached to the body,
each tape reel of the plurality of tape reels corresponds to a different tape of the plurality of tapes,
the cartridge has a distribution mechanism including gears to mesh with each other, the distribution mechanism distributing the drive force transmitted from the drive source to each of the plurality of tape reels, and
the distribution mechanism absorbs a speed difference among the plurality of tapes and constantly adjusts a tension of the plurality of tapes to a predetermined tension.

2. The sheet storage device according to claim 1, wherein the holder holds the plurality of tape reels around which the plurality of tapes are wound across an entire length thereof.

3. The sheet storage device according to claim 1, wherein the holder has a tape opening through which the plurality of tapes pass.

4. The sheet storage device according to claim 1, wherein
the drum winds up the sheet sandwiched by the plurality of tapes at least partially overlapping with each other, and
the holder holds the plurality of tape reels in a state in which the plurality of tape reels is arranged on an identical axis.

5. The sheet storage device according to claim 1, wherein the holder is divided into a plurality of portions.

6. The sheet storage device according to claim 1, wherein an engagement portion at the drum is detachably engaged with a tip end portion of a tape of the plurality of tapes.

7. The sheet storage device according to claim 1, further comprising:
a motor; and
a drive gear that transmits drive force from the motor to the plurality of tape reels, wherein
the cartridge is connected to the drive gear.

8. A sheet storage device, comprising:
a plurality of tape reels;
a holder to hold the plurality of tape reels; and
a body having a drum to wind, together with a plurality of tapes drawn out of the plurality of tape reels, a sheet around the drum to house the sheet, wherein
the plurality of tape reels and the holder are detachably attached to the body,
the plurality of tape reels comprises a first tape reel and a second tape reel,
the plurality of tapes comprises a first tape and a second tape,
the first tape is wound around the first reel and the second tape is wound around the second reel,
the drum winds up the sheet sandwiched by the first tape and the second tape, the first tape and the second tape wound around the drum at least partially overlapping with each other when viewed along a direction perpendicular to an axis of the drum, and
the holder holds the first tape reel and the second tape reel in a state in which the first tape reel and the second tape reel are arranged along a same axis.

9. The sheet storage device according to claim 8, wherein the holder holds the plurality of tape reels around which the plurality of tapes are wound.

10. The sheet storage device according to claim 8, wherein the holder has a tape opening through which the plurality of tapes pass.

11. The sheet storage device according to claim 8, further comprising:
a motor; and
a drive gear that transmits drive force from the motor to the plurality of tape reels.

12. The sheet storage device according to claim 8, wherein an engagement portion at the drum is detachably engaged with a tip end portion of a tape of the plurality of tapes.

13. A sheet storage device, comprising:
a cartridge having a plurality of tape reels and a holder to hold the plurality of tape reels; and
a body having a drum to wind, together with a plurality of tapes drawn out of the plurality of tape reels, a sheet around the drum to house the sheet, wherein
the cartridge is detachably attached to the body,
the plurality of tape reels comprises a first tape reel and a second tape reel,
the plurality of tapes comprises a first tape and a second tape,
the first tape is wound around the first reel and the second tape is wound around the second reel,
the drum winds up the sheet sandwiched by the first tape and the second tape, the first tape and the second tape wound around the drum at least partially overlapping with each other when viewed along a direction perpendicular to an axis of the drum, and
the holder holds the first tape reel and the second tape reel in a state in which the first tape reel and the second tape reel are arranged along a same axis.

* * * * *